(12) United States Patent
Ikarashi et al.

(10) Patent No.: US 7,043,111 B2
(45) Date of Patent: May 9, 2006

(54) OPTICAL PARTS COUPLING STRUCTURE, METHOD OF MANUFACTURING THE SAME, OPTICAL SWITCH, TWO-DIMENSIONAL LENS ARRAY, AND METHOD OF MANUFACTURING THE SAME

(75) Inventors: Yukiko Ikarashi, Kawasaki (JP); Masayuki Kato, Kawasaki (JP); Koji Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/243,415

(22) Filed: Oct. 5, 2005

(65) Prior Publication Data

US 2006/0029321 A1  Feb. 9, 2006

Related U.S. Application Data

(62) Division of application No. 10/446,834, filed on May 29, 2003.

(30) Foreign Application Priority Data

May 31, 2002 (JP) ............................. 2002-159447
Jul. 3, 2002 (JP) ............................. 2002-194030

(51) Int. Cl.
  *G02B 6/26* (2006.01)
  *G02B 6/42* (2006.01)

(52) U.S. Cl. ............................. 385/16; 385/14; 385/33; 385/38

(58) Field of Classification Search ................. 385/14, 385/16–24, 33, 38, 39, 52, 123–126, 130–132
See application file for complete search history.

(56) References Cited

U.S. PATENT DOCUMENTS 6,504,966 B1 * 1/2003 Kato et al. .................. 385/16
6,859,589 B1   2/2005 Taylor et al. ............... 385/52

FOREIGN PATENT DOCUMENTS

JP  2001-257835  9/2001
JP  2001-332169  10/2002

* cited by examiner

*Primary Examiner*—Phan Palmer
(74) *Attorney, Agent, or Firm*—Armstrong, Kratz, Quintos, Hanson & Brooks, LLP.

(57) ABSTRACT

A first optical waveguide having at least a core layer with a refractive index ncj and a second optical waveguide having at least a core layer with a refractive index nck are arranged to oppose their end surfaces, and at least any one end surface of the first optical waveguide and the second optical waveguide is formed by the etching, and the end surface formed by the etching is covered with a coating medium with a refractive index nij or nik that is equal to a refractive index ncj or nck of the core layer that is exposed from the end surface.

4 Claims, 23 Drawing Sheets

FIG. 6
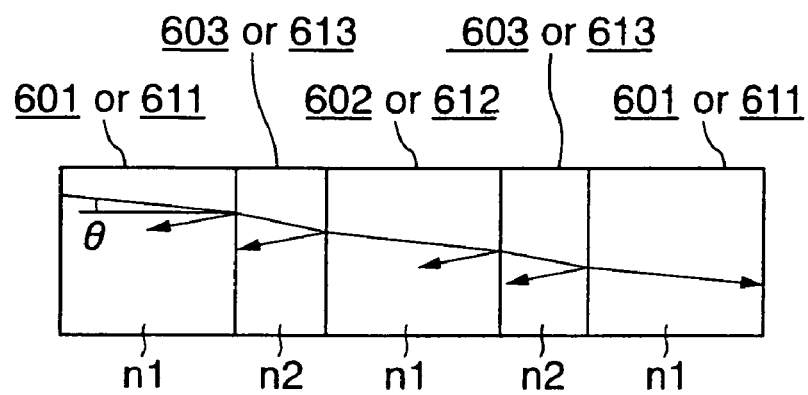
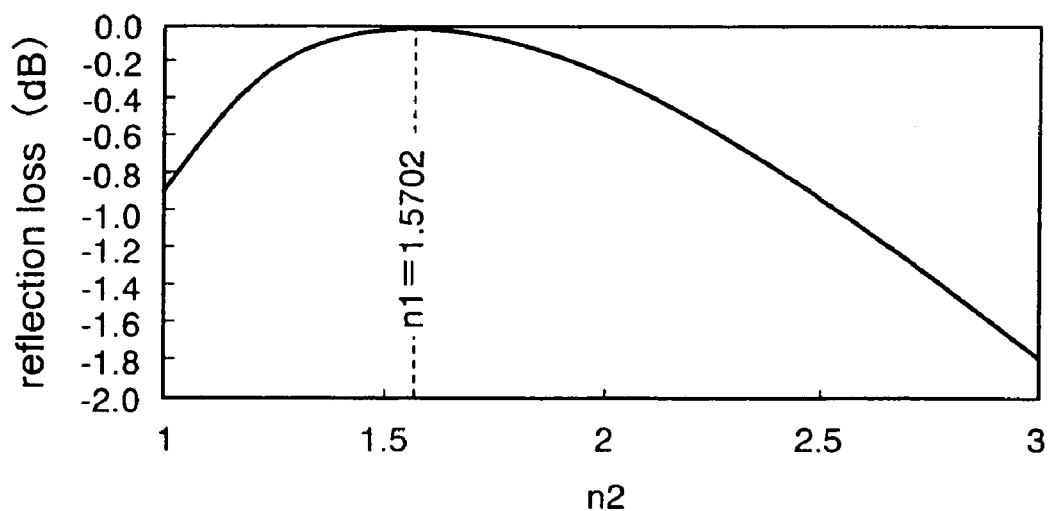

FIG. 8
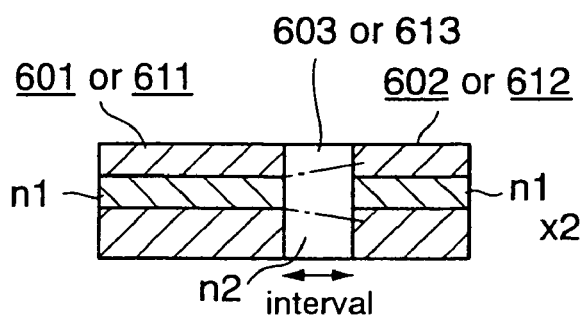
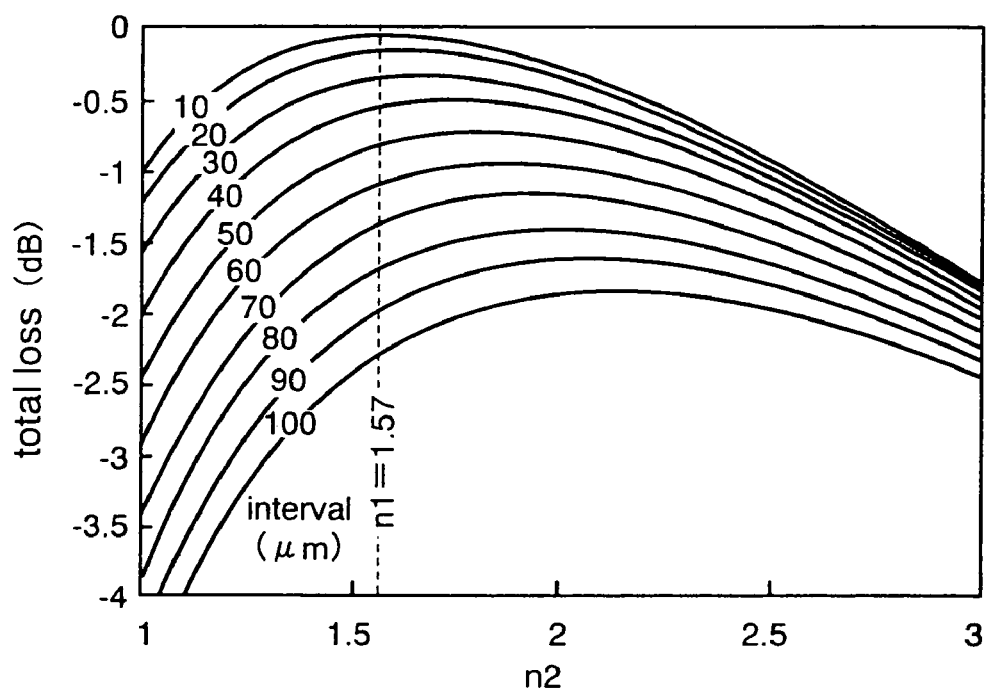

OPTICAL PARTS COUPLING STRUCTURE, METHOD OF MANUFACTURING THE SAME, OPTICAL SWITCH, TWO-DIMENSIONAL LENS ARRAY, AND METHOD OF MANUFACTURING THE SAME

This application is a divisional application of prior application Ser. No. 10/446,834, filed on May 29, 2003.

CROSS-REFERENCE TO RELATED APPLICATIONS

This application is based upon and claims priority of Japanese Patent Applications No. 2002-159447, filed on May 31, 2002, and No. 2002-194030, filed on Jul. 3, 2002, the contents being incorporated herein by reference.

BACKGROUND OF THE INVENTION

1. Field of the Invention

The present invention relates to a coupling structural body of optical parts, a method of manufacturing the same, and an optical switch module and, more particularly, a coupling structural body of optical parts such as an optical propagation system, an image forming system, and an optical deflecting system employed in an optical signal switching system (switching device, optical signal cross-connecting device) arranged at cross points of an optical network, a method of manufacturing the same, and an optical switch module.

The present invention relates to a two-dimensional lens array having a plurality of two-dimensional lenses each executes collimation or convergence of an optical signal propagated through a two-dimensional optical waveguide, an optical switch having this two-dimensional lens array, and a method of manufacturing the two-dimensional lens array.

2. Description of the Prior Art

The transmission band in the optical communication keeps on widening in recent years, and the higher speed and the larger capacity of the optical communication are advanced with the progress of the wavelength multiplexing technology. In order to establish the optical fiber network in the trunk communication network, the device for switching the destination of the optical signal is required.

The mainstream of such switching device was the optical cross-connecting device having an operation mode such that an optical signal is converted into an electric signal once, then the connection is switched in the state of the electric signal, and then the electric signal is converted into the optical signal once again. The electric switch such as a crossbar switch constructed by electronic switches, or the like was employed for switching in the state of the electric signal. However, when a data communication rate exceeds 10 Gb/s, it becomes difficult to switch the connection by using the electric switch.

If the optical switch that can switch directly the light propagation path is used in place of the electric switch to eliminate the photo-electric conversion, switching of the optical signal that does not depends on a rate (frequency) of the optical signal can be implemented. For this reason, there is a tendency such that the optical cross-connecting device using the optical switches is developed.

In the matrix-switch that employs the 2×2 switch as the base, an absolute value of loss and variation between ports become a problem if the number of ports is increased. Therefore, the analog optical deflection type switch, which has a small optical loss between paths, is preferable. More particularly, the switch of the optical beam switching type that employs the deflection by the micromirror can be used. There is the switch in which the micromirrors are integrated three dimensionally by using MEMS (microelectromechanical system) technology.

However, according to the optical switch in the MEMS technology, a size is large even in a 32×32 scale and a module size including the optical input/output port (fiber connector) becomes several tens cm square.

Meanwhile, if a plurality of m×n optical switches that are formed on a two-dimensional substrate are arranged to construct an optical switch group having a two-dimensional optical input/output port arrangement, a module size can be remarkably reduced into a small scale.

Therefore, a method of constructing the optical switch group on the two-dimensional substrate is promising for the optical cross-connecting switch.

The optical switch module constituting the optical switch group on the two-dimensional substrate is composed of optical parts such as a channel waveguide, a two-dimensional lens, an optical deflector element, etc. Each optical part is constructed by laminating an underlying cladding layer, a core layer, and an overlying cladding layer on a quartz substrate, and then patterning the core layer into a desired shape. The core layer constitutes a slab waveguide serving as a main optical waveguide, and causes a light to propagate in a flat plane.

In case the optical parts are to be arranged on the substrate, the light that is propagated through the optical waveguide must be optically coupled between the optical parts. Hence, the core layers of respective optical parts are opposed to each other in the coupling portion between the optical parts while an air layer is put therebetween.

However, in the coupling portion, which has the two-dimensional lens, out of the coupling portions between the optical parts, the light that is propagated through the optical waveguide must be collimated two-dimensionally and then coupled optically to the slab waveguide. In this case, there is the problem such that it is difficult to couple the light to the slab waveguide at a high efficiency.

This situation will be explained in detail. If the light is coupled optically by using the conventional two-dimensional lens, the air layer is interposed (in opposing portions) between the two-dimensional lens as the coupling portion and the slab waveguide. Thus, since the emitted light is converged in the in-plane direction but such light is diverged in the out-plane direction, a coupling efficiency is lowered. Also, a loss due to the reflection is increased by an increased difference in the refractive index between inside of the two-dimensional lens and outside thereof at the end surface thereof.

In order to overcome this problem, the prior application (Patent Application No. 2001-332169) filed by the same applicant as this application describes an example such that the resin of which the refractive index is larger than that of the atmosphere is buried in the opposing portion. According to this, first the filling resin film is formed by the patterning, and then a resin film to form the core layers is formed thereon, followed by polishing the resin film to form the core layers so as to planarize a surface thereof. It results in formation of the core layers putting the filling resin film therebetween. However, according to this forming method, the manufacturing steps become complicated and also control of a polished amount is needed.

The optical signal is suitable for the high-speed/large-capacity signal transmission. In the long-haul trunk communication system, the signal transmission using the optical signal has already been put into practical use. The optical switch for switching the transmission route of the optical signal is indispensable in such system. As the approach of implementing this optical switch, various systems have been proposed. In this case, for example, the optical switch using the optical deflector element is expected to bring the high-speed switching operation. Such optical deflector element is provided with the crystal, as the optical waveguide, having an electro-optical effect such that the refractive index is changed by the electric field. Prism-like electrodes are formed on and under the optical waveguide, and deflect the light that is propagated through the optical waveguide by the voltage applied to the electrodes.

FIGS. 1A and 1B are views showing an example of a configuration of a part of the optical switch using the optical deflector element in the prior art. FIG. 1A is a plan view showing a part of the optical switch, and FIG. 1B is a sectional view taken along a XI—XI line in FIG. 1A.

FIGS. 1A and 1B show, as an example, input-side constituent elements of an optical switch 800 having 8 input channels. The optical switch 800 on the input side is provided with an optical input waveguide portion 820, a collimator portion 830, and an optical deflector element portion 840. The optical switch 800 on the output side is provided with a common optical waveguide 850. In this optical switch 800, for example, the optical input waveguide portion 820, the collimator portion 830, and the common optical waveguide 850 are provided integrally on a common substrate 801, and then the optical deflector element portion 840 is mounted on this substrate 801.

A plurality of optical input waveguides 821, each corresponds to each input channel, are formed in the optical input waveguide portion 820. An optical fiber, or the like, for example, is connected to an incident end of each optical input waveguide 821. The optical signals are incident on the optical fibers respectively.

A plurality of collimator lenses 831, each corresponds to each optical input waveguide 821, are formed in the collimator portion 830. Each collimator lens 831 has a waveguide layer 832 as the slab optical waveguide on which the optical signal is incident from the optical input waveguide 821, and an air-gap filling layer 833 which is formed of the medium being different from the waveguide layer 832 in the refractive index. In the air-gap filling layer 833, an air-gap region that passes through the core layer and overlying/underlying cladding layers in the waveguide layer 832 is filled with a fluororesin, or the like to prevent the diffusion of light, for example. Then, an end surface of the waveguide layer 832 opposing to the air-gap filling layer 833 is shaped into a circular cylindrical surface, for example, to constitute a lens curved surface 834 of the two-dimensional lens. According to such structure, in each collimator lens 831, the optical signal that is propagated from the optical input waveguide 821 to spread radially in the waveguide layer 832 is converted in the parallel light by the lens curved surface 834, and then is emitted to the optical deflector element portion 840.

A plurality of optical deflector elements 841, each corresponds to the input channel, are provided in the optical deflector element portion 840. In each optical deflector element 841, the refractive index in a slab optical waveguide 842 is changed when the voltages is applied to the slab optical waveguide 842, which is made of the material having the electro-optical effect, via a prism-type electrode 843 serving as a lower electrode and a conductive substrate 844 serving as an upper electrode. Thus, the propagation direction of the incident optical signal is changed.

The common optical waveguide 850 is the slab optical waveguide which propagates commonly all optical signals, of which the connection is switched between the channels on the input and output sides. The common optical waveguide 850 transmits the optical signal that passes through the optical deflector element portion 840 to the output side.

In this case, the common optical waveguide 850 on the output side are provided with the constituent elements that are similar to the optical input waveguide portion 820, the collimator portion 830, and the optical deflector element portion 840, as shown in FIGS. 1A and 1B, in the opposite direction to the common optical waveguide 850. In other words, the common optical waveguide 850 on the output side is provided with output-side optical deflector element portion, light converging portion, and optical output waveguide portion. Those portions have the plural optical deflector elements, the plural light converging lenses, and the plural optical output waveguides to correspond to the number of output channels respectively. Then, the optical signal that propagates through the common optical waveguide 850 is incident on the corresponding light converging lens since its propagation direction is changed by the optical deflector element on the output side, and then such optical signal is focused onto the corresponding optical output waveguide by the light converging lens and then is output to the outside from the optical output waveguide.

According to such configuration, in the optical switch 800, the propagation direction of the input optical signal is changed in the common optical waveguide 850 by controlling the voltage applied to the optical deflector elements on the incident side and the emissive side in the common optical waveguide 850. Thus, the connection between any input channel and any output channel can be switched.

By the way, in the above optical switch 800, the light that propagates through the waveguide layer 832 from the optical input waveguide 821 is collimated by the lens curved surface 834 in the collimator portion 830. However, the light emitted from the optical input waveguide 821 propagates through the waveguide layer 832 to spread radially. Therefore, in the waveguide layer 832, most of the incident light propagates through the area in which the light can be collimated by the lens curved surface 834. However, actually a part of the light propagates to the outside of this area.

In this manner, the light outside this area which can collimate such light propagates to the neighborhood of the edge portion of the lens curved surface 834 or to the neighboring lens curved surface 834. Thus, there are some cases that the stray light is generated at these portions. For example, the light that is propagated to the edge portion of the lens curved surface 834 is caused to spread in respective directions at this portion, and then the light that is propagated to the neighboring lens curved surface 834 is emitted from the lens curved surface 834 in the direction that is different from the direction to direct.

In particular, in the case of the optical switch 800 having a plurality of input channels, the collimator portion 830 has a configuration such that the lens curves surfaces 234 of the two-dimensional lenses are aligned to correspond to respective input channels. Therefore, there was a serious problem such that the crosstalk is generated due to the light that propagated to the neighboring lens curved surface 834.

Also, in the light converging lens in the light converging portion that is provided to the common optical waveguide 850 on the output side, it is possible that a part of the light emitted from the optical deflector element on the preceding stage is not focussed onto the optical output waveguide on the output side. In this case, a part of the light is incident on the cladding area that surrounds the each optical output waveguide. In some cases, such light exerts a bad influence on the optical signal that propagates through the optical output waveguide.

SUMMARY OF THE INVENTION

It is an object of the present invention to provide a coupling structural body of optical parts capable of achieving a simplification of manufacturing steps, improving a coupling efficiency at an optical coupling portion, and reducing a loss due to a reflection at an interface between optical parts in the optical coupling portion, a method of manufacturing the same, and an optical switch module.

It is another object of the present invention to provide a two-dimensional lens array capable of preventing generation of a crosstalk between channels, and also improving a quality of the propagated optical signal.

It is still another object of the present invention to provide an optical switch capable of preventing the generation of the crosstalk between the channels, and also improving a quality of the propagated optical signal.

A coupling structural body of optical parts set forth in claim 1 of this application is constructed by arranging a first optical waveguide having a laminated structure of an underlying cladding layer with a refractive index nuj, a core layer with a refractive index ncj and an overlying cladding layer with a refractive index noj, and a second optical waveguide having a laminated structure of an underlying cladding layer with a refractive index nuk, a core layer with a refractive index nck and an overlying cladding layer with a refractive index nok so as to oppose end surfaces exposed with the overlying cladding layer to the underlying cladding layer to each other, and then filling a filling medium with a refractive index ni(j,k) between the mutual end surfaces, whereby at least one end surface of both end surfaces is formed as a two-dimensional lens and a light propagates from one optical waveguide to other optical waveguide through the filling medium.

According to the coupling structural body of optical parts described by the present invention, both the first and second optical waveguides are arranged to oppose their end surfaces exposed with the overlying cladding layer to the underlying cladding layer to each other, and a portion between the mutual end surfaces is filled with the filling medium with the refractive index ni(j,k).

In order to construct such structure, for example, the overlying cladding layers, the core layers, and the underlying cladding layers are laminated and then the overlying cladding layers to the underlying cladding layers are etched continuously. Thus, the first and second optical waveguides are formed to oppose mutually their end surfaces exposed with the overlying cladding layers to the underlying cladding layers. Then, a portion between the opposed end surfaces is filled with the filling medium.

In this manner, since the polishing step set forth in the prior application (Patent Application No. 2001-332169) is not needed, simplification of the steps can be attained. Also, since film thicknesses of the core layers, etc. are decided at the time of film formation, control of the film thickness can be facilitated. In addition, a portion between the opposed end portions is filled with the filling medium with the refractive index ni(j,k). Therefore, as shown in FIG. 8, if the refractive index ni(j,k) is selected appropriately, the loss can be reduced in contrast to the case where a portion between the end surfaces is filled with the air layer (ni(j,k)=1), and also the margin for the interval between the end surfaces can be delivered.

In the coupling structural body of optical parts set forth in claim 2 of this application, the refractive index ni(j,k) of the filling medium is selected such that, when the light propagates from one optical waveguide to other optical waveguide through the filling medium, a total loss of a reflection loss and a coupling loss is reduced smaller than a predetermined value.

According to the present invention, as shown in FIG. 8, if the refractive index ni(j,k) (n2) of the filling medium is selected appropriately, the loss can be reduced rather than the case where a portion between the opposing end surfaces is filled with the air layer (n2=1). Also, if the particular refractive index ni(j,k) (n2) is selected, the selectable range of the interval between the end surfaces to provide the loss that is smaller than the predetermined value can be expanded. Thus, the margin for the interval between the end surfaces can be delivered.

A method of manufacturing a coupling structural body of optical parts, set forth in claim 6 of this application comprises the steps of laminating an underlying cladding layer with a refractive index nu, a core layer with a refractive index nc, and an overlying cladding layer with a refractive index no on a substrate; etching continuously the underlying cladding layer to the overlying cladding layer and thus forming a first optical waveguide and a second optical waveguide so as to oppose mutually those end surfaces exposed with the overlying cladding layer to the underlying cladding layer; and filling a filling medium with a refractive index ni(j,k) between opposing end surfaces.

According to the method of manufacturing the coupling structural body of optical parts of the present invention, the first optical waveguide and the second optical waveguide are formed so as to oppose mutually those end surfaces exposed with the overlying cladding layer to the underlying cladding layer. Then, a portion between the opposing end surfaces is filled with the filling medium.

Therefore, since the polishing step set forth in the prior application is not needed, simplification of the steps can be attained. Also, since film thicknesses of the core layers, etc. are decided at the time of film formation, the control of the film thickness can be facilitated.

An optical switch module set forth in claim 8 of this application comprises a collimator portion for collimating a plurality of optical signals individually by two-dimensional lenses respectively; a plurality of first optical deflector elements for switching individually propagation directions of the respective optical signals passed through the collimator portion by using an electrooptic effect; a common optical waveguide for propagating the optical signals passed through the plurality of first optical deflector elements respectively; a plurality of second optical deflector elements for switching individually the propagation directions of the respective optical signals passed through the common optical waveguide by using the electrooptic effect; and a light converging portion for converging individually the respective optical signals passed through the plurality of second optical deflector elements by the two-dimensional lenses; wherein at least any one of the collimator portion and the light converging portion is provided with the coupling structural body of optical parts set forth in any one of claim 1 and claim 5.

According to the optical switch module of the present invention, since the coupling structural body of optical parts set forth in claim 1 or 2 is provided, simplification of the manufacturing steps can be attained, and also the coupling efficiency can be improved. Thus, the loss caused by the reflection at interfaces of the optical coupling portion can be reduced.

In a coupling structural body of optical parts set forth in claim 10 of this application, a first optical waveguide having at least a core layer with a refractive index ncj and a second optical waveguide having at least a core layer with a refractive index nck are arranged to oppose end surfaces to each other, any one of the end surfaces of the first optical waveguide and the second optical waveguide is formed by etching, and the end surface formed by the etching is covered with a coating medium having a refractive index nij or nik that is equal to a refractive index ncj or nck of the core layer exposed from the end surface.

According to the coupling structural body of optical parts of the present invention, the end surface formed by the etching is covered with the coating medium having the refractive index nij or nik that is equal to the refractive index ncj or nck of the core layer exposed from the end surface.

Since the refractive index nij or nik of the coating medium is equal to the refractive index ncj or nck of the core layer exposed from the end surface, such coating medium can be practically regarded as the core layer with respect to the propagation of the light. Therefore, even if the unevenness is generated by the etching on the end surface at the opposing portions of the first or second optical waveguide, the substantially smooth end surface of the optical waveguide can be obtained by uniformizing the unevenness on the end surface by means of the coating medium. As a result, the light which propagates through the optical waveguide can be prevented from the scattering at the end surface, and thus the loss due to the reflection and the coupling loss can be reduced.

In the coupling structural body of optical parts set forth in claim 12 of this application, the end surface of at least any one of the first and second optical waveguides constitutes a two-dimensional convex lens. In the coupling structural body of optical parts set forth in claim 13 of this application, a filling medium having a refractive index ni(j,k) which is lower than the refractive index ncj or nck, as well as a portion between opposing end surfaces is filled with the coating medium that coats the end surface.

According to the coupling structural body of optical parts of the present invention, the area next to the two-dimensional convex lenses whose end surfaces are made smooth by the coating medium is filled with the filling medium with the refractive index ni(j,k), which is lower than the refractive indexes of the core layers. Thus the loss due to the reflection can be reduced and also the light that is transmitted through the two-dimensional lenses can be collimated. Therefore, the propagation loss of the light can be reduced.

In the coupling structural body of optical parts set forth in claim 14 of this application, the end surface of at least any one of the first and second optical waveguides constitutes a two-dimensional concave lens. In the coupling structural body of optical parts set forth in claim 15 of this application, a filling medium having a refractive index ni(j,k) which is higher than the refractive index ncj or nck, as well as a portion between opposing end surfaces is filled with the coating medium that coats the end surface.

According to the coupling structural body of optical parts of the present invention, the area next to the two-dimensional convex lenses whose end surfaces are made smooth by the coating medium is filled with the filling medium with the refractive index ni(j,k) which is lower than the refractive indexes of the core layers. Thus the loss due to the reflection can be reduced and also the light that is transmitted through the two-dimensional lenses can be collimated. Therefore, the propagation loss of the light can be reduced.

An optical switch module set forth in claim 16 of this application comprises a collimator portion for collimating a plurality of optical signals individually by two-dimensional lenses respectively; a plurality of first optical deflector elements for switching individually propagation directions of the respective optical signals passed through the collimator portion by using an electrooptic effect; a common optical waveguide for propagating the respective optical signals that are passed through the plurality of first optical deflector elements respectively; a plurality of second optical deflector elements for switching individually the propagation directions of the respective optical signals passed through the common optical waveguide by using the electrooptic effect; and a light converging portion for converging individually the respective optical signals passed through the plurality of second optical deflector elements by the two-dimensional lenses; wherein any one of the collimator portion and the light converging portion is provided with the coupling structural body of optical parts set forth in any one of claim 10 and claim 15.

According to the optical switch module of the present invention, since the coupling structural body of optical parts set forth in any one of claims 10 to 15 is provided, the propagation loss of light in the optical coupling portion can be reduced.

In order to overcome the above another problem, according to the present invention, as shown in FIG. 21, there is provided a two-dimensional lens array which comprises a slab optical waveguide having an incident/emissive end surface into/from which a plurality of optical signals are input/output respectively; and a plurality of lens curved surfaces formed at a boundary surface between the slab optical waveguide and another medium with a different refractive index to respond to the optical signals respectively; wherein a light absorbing body is provided on both sides of propagation areas of each optical signal between the incident/emissive end surface and each lens curved surface respectively.

In such two-dimensional lens array, for example, if the optical signal propagates through the slab optical waveguide to the lens curved surface 734, the light absorbing body 735 is provided in the slab optical waveguide on both sides of the propagation area of the optical signal, and therefore the extra light that is not precisely incident on the lens curved surface 734 and the scattered light from the end portion of the lens curved surface 734, etc. can be absorbed by such light absorbing body 735. Also, if the optical signal is incident on the slab optical waveguide from the lens curved surface 734, the extra light that passed through the lens curved surface 734 and then propagates through the outside of the predetermined area of the emissive end can be absorbed by the light absorbing body 735.

Also, according to the present invention, there is provided an optical switch for switching a propagation path of an optical signal, which comprises a plurality of optical input waveguides for receiving optical signals from an outside; a plurality of optical output waveguides for outputting the optical signals to the outside; a plurality of collimator lenses for collimating the optical signals, which passed through the optical input waveguides, individually; first light absorbing bodies arranged on both sides of propagation areas of the optical signals in the collimator lenses corresponding to the respective optical input waveguides; a plurality of input-side optical deflector elements for switching propagation directions of the optical signals, which passed through the respective collimator lenses, individually; a common optical waveguide through which the optical signals that passed through the input-side optical deflector elements propagate commonly; a plurality of output-side optical deflector elements for switching the propagation directions of the optical signals, which passed through the common optical waveguide, individually; a plurality of light converging lenses for focusing the optical signals, which passed through the output-side optical deflector elements, onto the optical output waveguides individually; and second light absorbing bodies arranged on both sides of the propagation areas of the optical signals that propagate from the light converging lenses to the optical output waveguides.

In such optical switch, since the first light absorbing body is provided on both sides of the propagation area of the optical signal from the optical input waveguide to the corresponding collimator lens, the extra light that is not precisely incident on the collimator lens and the scattered light from the end portion of the lens curved surface of the collimator lens, etc. can be absorbed by such first light absorbing body. Also, since the second light absorbing body is provided on both sides of the propagation area of the optical signal from the light converging lens to the corresponding optical output waveguide, the extra light that is not precisely incident on the optical output waveguide can be absorbed by such second light absorbing body.

BRIEF DESCRIPTION OF THE DRAWINGS

FIG. 6 is a graph showing calculated results of a reflection loss with respect to a refractive index of a filling medium in the optical coupling portion as the first embodiment;

FIG. 8 is a graph showing examined results of a total loss that is obtained by adding both the reflection loss and the coupling loss with respect to the refractive index of the filling medium while using the interval between the end surfaces as the parameter, in the optical coupling portion as the first embodiment;

DETAILED DESCRIPTION OF THE PREFERRED EMBODIMENTS

Embodiments of the present invention will be explained with reference to the drawings hereinafter.

First Embodiment

Figure 1:
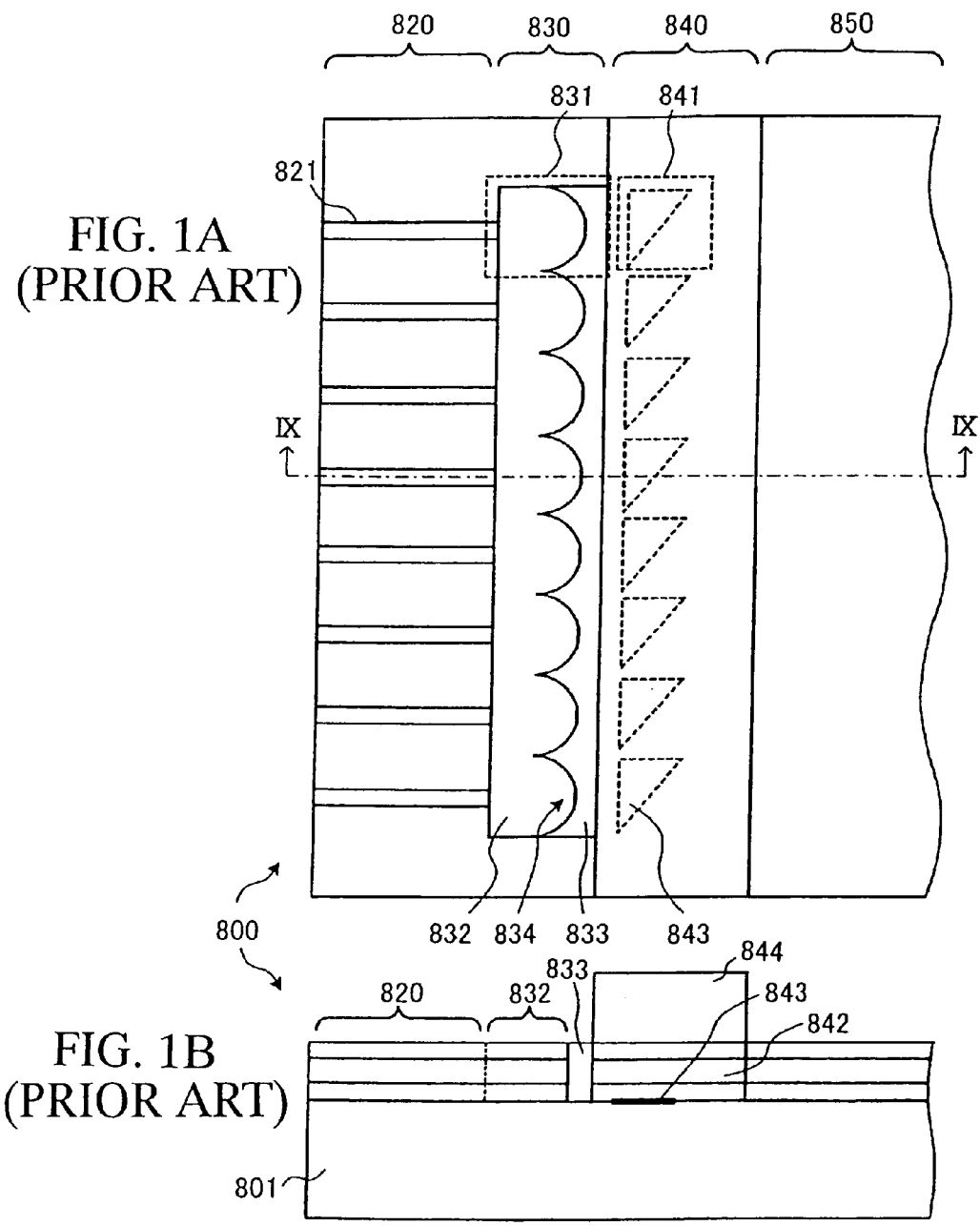
FIG. 1A is a plan view showing an example of a configuration of a part of the optical switch using the optical deflector element in the prior art.
FIG. 1B is a sectional view showing the same.
Figure 2:
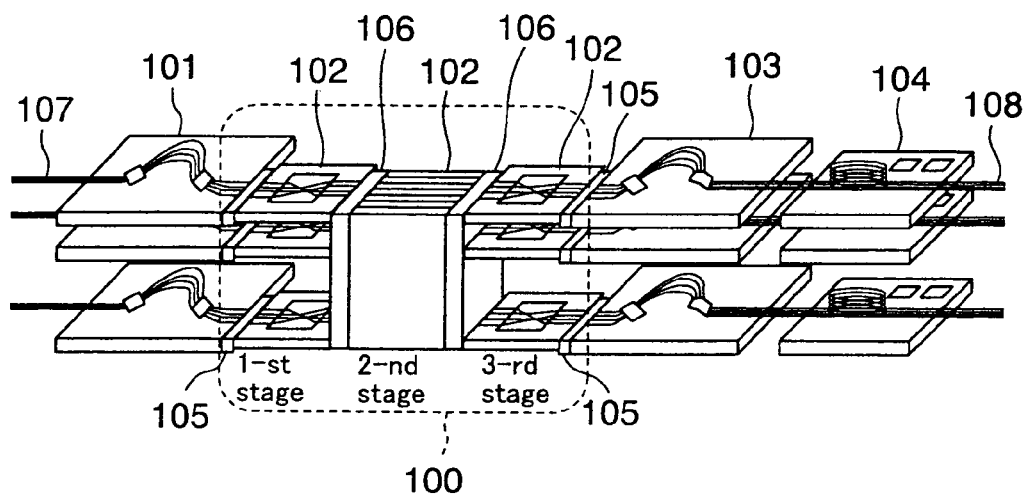
FIG. 2 is a schematic plan view showing an optical signal switching device using an optical switch module according to a first embodiment of the present invention.

FIG. 2 is a schematic plan view showing an optical signal switching device using an optical switch module according to a first embodiment of the present invention. This optical signal switching device receives at 40 Gb/s and 64-system WDM signals in which the optical signals corresponding to 64 wavelengths are multiplexed and then switches transmission destinations of these optical signals.

This optical signal switching device is constructed by 64 AWG optical demultiplexers 101 aligned in the vertical direction, an optical switch module group 100 having a 3-stage configuration, 64 optical multiplexers 103, and 64 optical amplifiers (EDFA: Erbium Doped Fiber Amplifier) 104. The optical switch module group 100 comprises a set of optical switch module group which is constructed by arranging 64 64×64-channel optical switch modules 102 in the direction that is perpendicular to the substrate, and then the second-stage optical switch module group is rotated with respect to first and third-stage optical switch module groups by 90.

Also, optical connectors 105 connect the optical demultiplexer 101 with the first-stage optical switch module group, and the third-stage optical switch module group with the optical multiplexer 103 respectively. Optical connectors 106 connect the first-stage optical switch module group with the second-stage optical switch module group, and the second-stage optical switch module group with the third-stage optical switch module group respectively. The optical connectors 105, 106 consist of the substrate and a large number of micro lenses that pass the light in the thickness direction of this substrate.

Lenses of these optical connectors 105, 106 converge the light output from the optical device at the preceding stage to transmit such light to the optical device at the succeeding stage, and thus are useful for reduction in a propagation loss.

In this optical signal switching device, the multiplexed optical signal is separated into individual optical signals by the optical demultiplexer 101. Then, propagation destinations of respective optical signals are switched by the optical switch module group 100. Here, three sets of optical switch module groups are constructed by combining 64 64×64-channel optical switch modules 102 respectively such that three-stage configuration (cascade connection) is constructed by rotating each of three sets of optical switch module groups by 90. Thus, the optical signal that is input into any input port can be output to any output port of 4096 output ports. The optical signals whose transmission destinations are switched by the optical signal switching device are multiplexed by the optical multiplexer 103 every destination, then amplified by the optical amplifier 104, and then output.

In the optical signal switching device shown in FIG. 2, each of the first, second, and third optical switch module groups is constructed by arranging 64 64×64-channel optical switch modules 102 respectively. However, the first and third optical switch module groups may be constructed by arranging 128 optical switch modules 102 in 2 columns along the width direction and in 64 columns along the height direction, while the second optical switch module group may be constructed by 128 64×64-channel optical switch modules 102 being arranged in the direction that is rotated by 90 with respect to the optical switch modules 102 in the first and third optical switch module groups.

In this case, the description is performed with respect to the case of controlling the deflection angle of the optical signal by changing the voltage applied to control electrodes in the prism pairs. But the deflection angle of the optical signal may be controlled by changing the number of the prism pairs, to which the control voltage is applied, while keeping the control voltage at a constant level.

Figure 3:
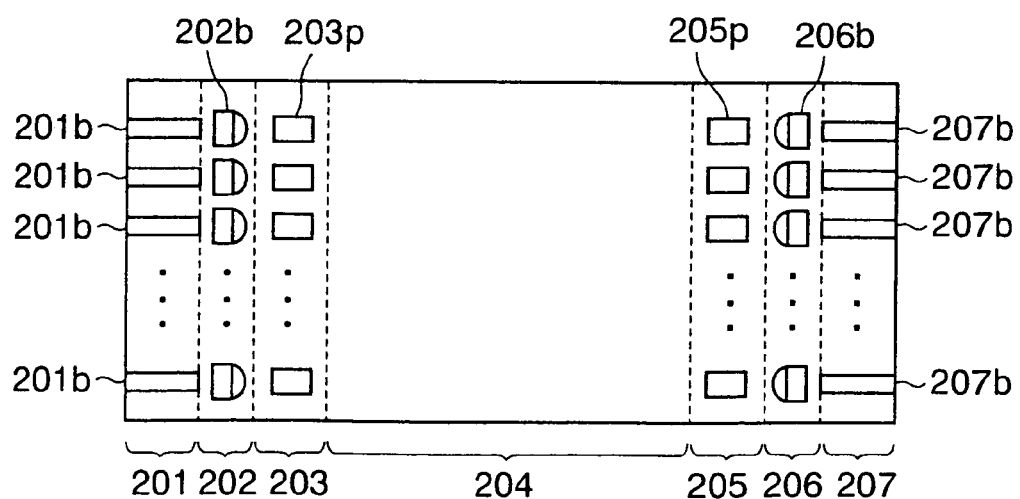
FIG. 3 is a schematic plan view showing a configuration of the optical switch module according to the first embodiment of the present invention.

FIG. 3 is a schematic plan view showing a configuration of the optical switch module 102 according to the first embodiment of the present invention.

This optical switch module 102 consists of an incident-side optical waveguide portion 201, a collimator portion 202, an incident-side optical deflector element portion (first optical deflector element) 203, a common optical waveguide portion 204, an emissive-side optical deflector element portion (second optical deflector element) 205, a light converging portion 206, and an emissive-side optical waveguide portion 207. The incident-side optical waveguide portion 201, the collimator portion 202, the incident-side optical deflector element portion 203, the common optical waveguide portion 204, the emissive-side optical deflector element portion 205, the light converging portion 206, and the emissive-side optical waveguide portion 207 are formed on the substrate. Then, a coupling structural body of optical parts is provided to at least to any one of the collimator portion 202 and the light converging portion 206.

The incident-side optical waveguide portion 201 consists of a plurality of core layers 201b as the main optical waveguides, and cladding layers for covering these core layers 201b to confine the light within the core layers 201b due to difference in their refractive indexes. Like this, the emissive-side optical waveguide portion 207 consists of a plurality of core layers 207b as the main optical waveguides, and cladding layers for covering these core layers 207b to confine the light within the core layers 207b due to difference in their refractive indexes.

In the present embodiment, assume that the number of the optical waveguides (core layers) 201b in the incident-side optical waveguide portion 201 is set equal to the number of the optical waveguides (core layers) 207b in the emissive-side optical waveguide portion 207. However, the present invention is not limited to this. The number of the incident-side optical waveguides may be set differently from the number of the emissive-side optical waveguides.

The collimator portion 202 consists of n pieces of collimator lenses (core layers) 202b. The collimator lenses 202b are arranged at positions that are slightly remote from end portions of the optical waveguides 201b respectively. The light that is emitted from the optical waveguide 201b spreads radially and then becomes a parallel light by the collimator lens 202b.

The incident-side optical deflector element portion 203 is provided with n pieces of optical deflector elements 203p each having the optical waveguide through which the optical signal propagates. The optical deflector elements 203p are arranged at positions that are slightly remote from the collimator lenses 202b in the optical-axis direction respectively. The optical deflector elements 203p deflect the propagation direction of the optical signal by utilizing the Pockels effect (electrooptic effect).

The common optical waveguide portion 204 has the slab waveguides. The common optical waveguide portion 204 transmits the light, which passed through the incident-side optical deflector element portion 203, to the emissive-side optical deflector element portion 205. A plurality of optical signals pass simultaneously through the slab waveguides. Since these optical signals go straight on in the slab waveguides in the determined direction, such optical signals can be transmitted without interference with other optical signals.

The emissive-side optical deflector element portion 205 is provided with n pieces of optical deflector elements 205p each having the optical waveguide through which the optical signal propagates. These optical deflector elements 205p deflect the lights, which come up to the optical deflector elements 205p through the common optical waveguide portion 204, in the direction that is parallel with the optical waveguide. The optical deflector elements 205p have basically the same structure as the optical deflector elements 203p in the incident-side optical deflector element portion 203.

The light converging portion 206 have n pieces of light converging lenses 206b that are formed by patterning the core layer. These light converging lenses 206b have a function of converging the lights, which passed through the optical deflector elements 205p, to lead such lights to the optical waveguides (core layers) 207b in the emissive-side optical waveguide portion 207.

The description is performed partially with respect to the emissive-side optical waveguide portion 207 in connection with the incident-side optical waveguide portion 201. In addition, like the arrangement of the optical waveguides 201b and the collimator lenses 202b in the incident-side optical waveguide portion 201, the light converging lenses 206b are arranged at positions that are slightly remote from end portions of the optical waveguides 207b in the emissive-side optical waveguide portion 207 respectively. Then, the parallel lights are converged into the optical waveguides 207b by the light converging lenses 206b.

Figure 4A:
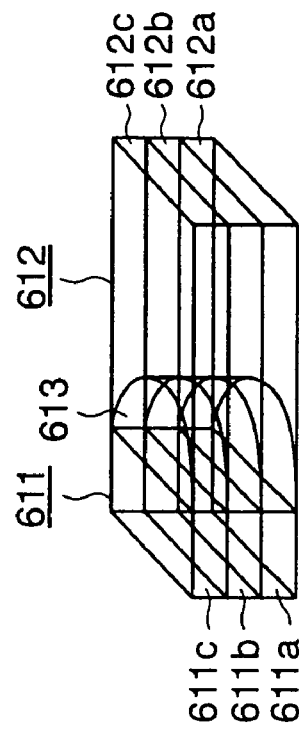
FIG. 4A is a perspective view showing coupling portions between a two-dimensional convex lens and an optical waveguide as the first embodiment.
Figure 4B:
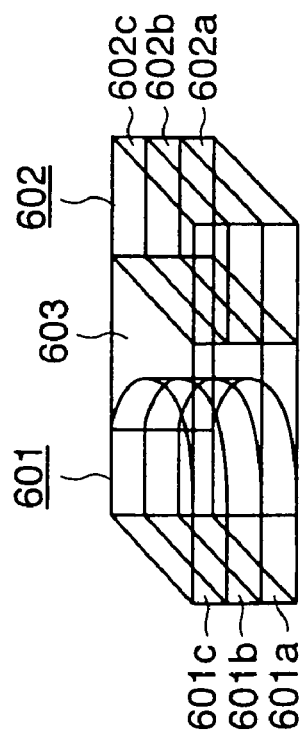
FIG. 4B is a perspective view showing an optical waveguide and a two-dimensional concave lens as the first embodiment.
Figure 4C:
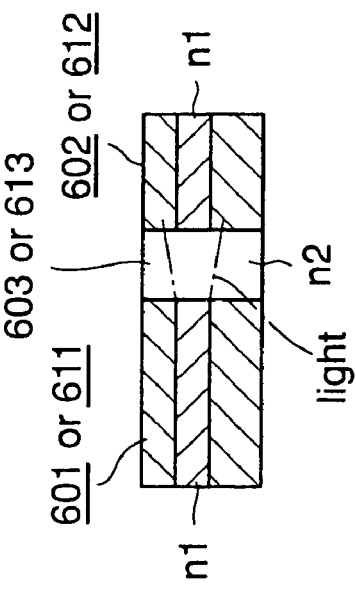
FIG. 4C is a sectional view showing a behavior of light propagation in the coupling portions in FIG. 4A and FIG. 4B.

Next, the description will be performed with respect to the coupling structural bodies of the optical parts such as the optical propagation system, the image forming system, the optical deflector system, etc. with reference to FIGS. 4A to 4C hereunder.

FIG. 4A is a perspective view showing coupling portions between a two-dimensional convex lens 601 and an optical waveguide 602 as the first embodiment, FIG. 4B is a perspective view showing an optical waveguide 611 and a two-dimensional concave lens 612 as the first embodiment, and FIG. 4C is a sectional view showing a behavior of light propagation in the coupling portions in FIG. 4A and FIG. 4B.

Now, the description will be performed hereunder with respect to the case where the light propagates from the left to the right. But the same is true of the case where the light propagates oppositely. Therefore, the optical waveguides 602, 611 constitute the incident-side optical deflector element portion 203 and the emissive-side optical deflector element portion 205, for example. Otherwise, in some cases such optical waveguides 602, 611 constitute the common optical waveguide portion 204 that is directly coupled to two-dimensional lenses 202, 206 by omitting the incident-side optical deflector element portion 203 and the emissive-side optical deflector element portion 205.

In FIG. 4A, a feature of the coupling portion between the two-dimensional convex lens 601 and the optical waveguide 602 will be given as follows. The first optical waveguide 601, which is formed by laminating an underlying cladding layer 601a with a refractive index nu1 (nuj), a core layer 601b with a refractive index n1 (nc1(ncj)), and an overlying cladding layer 601c with a refractive index no1 (noj), and the second optical waveguide 602, which is formed by laminating an underlying cladding layer 602a with a refractive index nu2 (nuk), a core layer 602b with a refractive index n2 (nc2(nck)), and an overlying cladding layer 602c with a refractive index no2 (nok), are arranged to oppose their end surfaces to each other. The end surfaces are formed by etching successively the overlying cladding layer to the underlying cladding layer. The end surface of the first optical waveguide 601 constitutes two-dimensional convex lens. A portion between opposing end surfaces is filled with filling medium 603 with a refractive index n2 (ni12(ni(j,k))). The light propagates from the first optical waveguide 601 to the second optical waveguide 602 via the filling medium 603. The refractive index n2 of the filling medium 603 is selected such that, when the light propagates through this coupling portion, a total loss of a reflection loss and a coupling loss is reduced smaller than a predetermined value.

From a viewpoint of reducing the reflection loss and the coupling loss, a value that is higher or lower than the refractive index n1 may be employed as the refractive index n2. It is preferable that, if the above coupling structural body is applied to the optical switch module, the value of the refractive index n2 should be set lower than the refractive index n1 to collimate the light by the two-dimensional concave lens 601 in the collimator portion and to converge the light in the light converging portion. Hence, as shown in FIG. 4A, the vertical spread of the propagated light can be suppressed and the above coupling structural body contributes to the reduction in loss.

In FIG. 4B, the coupling portion between the optical waveguide 611 and the two-dimensional concave lens 612 has the same structure as that shown in FIG. 4A except a planar shape of the two-dimensional concave lens 612.

In other words, the first optical waveguide 611, which is formed by laminating an underlying cladding layer 611a with a refractive index nu1 (nuj), a core layer 611b with a refractive index n1 (nc1(ncj)), and an overlying cladding layer 611c with a refractive index no1 (noj), and the second optical waveguide 612, which is formed by laminating an underlying cladding layer 612a with a refractive index nu2 (nuk), a core layer 612b with a refractive index n2 (nc2 (nck)), and an overlying cladding layer 612c with a refractive index no2 (nok), are arranged to oppose their end surfaces to each other. The overlying cladding layers 611c, 612c to the underlying cladding layers 611a, 612a are exposed from both end surfaces of the opposing portions. The end surface of the second optical waveguide (core layer) 612b constitutes the two-dimensional concave lens.

Then, a refractive index n2 (ni12(ni(j,k))) of a filling medium 613 between the opposing end surfaces is selected such that, when the light propagates through this coupling portion, the total loss of the reflection loss and the coupling loss is reduced smaller than a predetermined value.

In this case, from a viewpoint of reducing the reflection loss and the coupling loss, the value that is higher or lower than the refractive index n1 may also be employed as the refractive index n2. If the above coupling structural body is applied to the optical switch module, preferably the value of the refractive index n2 should be set higher than the refractive index n1 to collimate the light by the two-dimensional concave lens 612 in the collimator portion and to converge the light in the light converging portion. Hence, as shown in FIG. 4C, it can suppress the vertical spread of the propagated light and contributes to the reduction in loss.

Examined results of the reflection loss and the coupling loss in the coupling structural body of the optical parts according to the first embodiment will be explained with reference to FIG. 6, FIG. 7, and FIG. 8 hereunder.

Figure 5A:
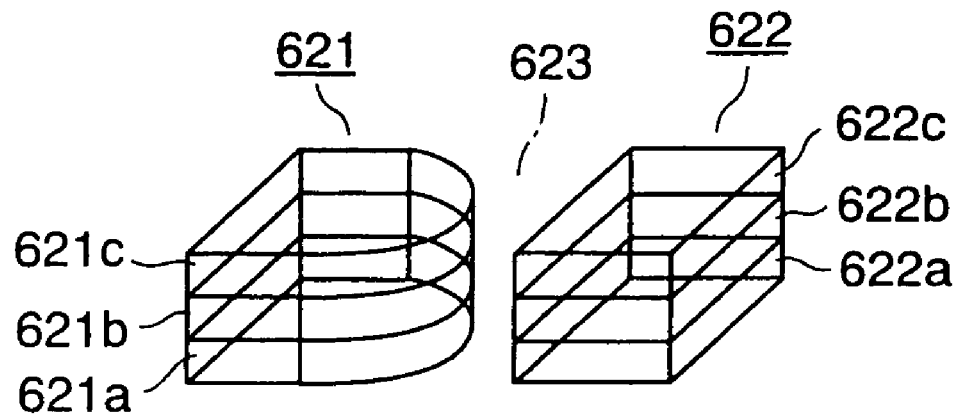
FIG. 5A is a perspective view showing a coupling portion between a two-dimensional convex lens and an optical waveguide in a comparative example.
Figure 5B:
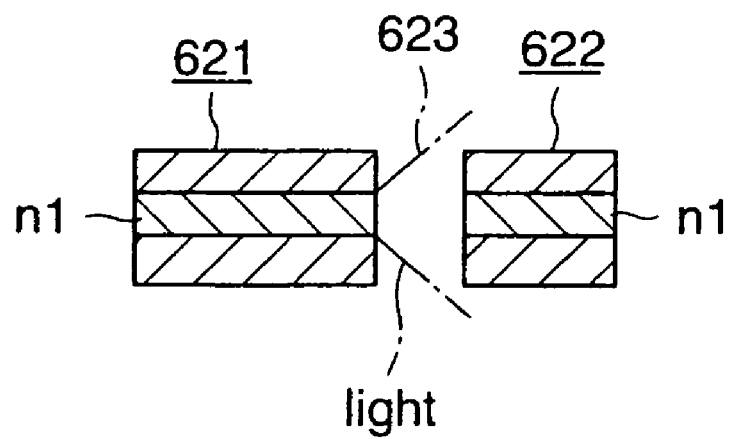
FIG. 5B is a sectional view showing a behavior of light propagation in the coupling portion.

For comparison, the reflection loss and the coupling loss in the coupling structural body of the optical parts in FIGS. 5A and 5B were similarly examined. FIG. 5A is a perspective view showing a coupling portion between a two-dimensional convex lens 621 and an optical waveguide 622, and FIG. 5B is a sectional view showing a behavior of light propagation in the coupling portion. In this comparative example, as shown in FIG. 5A, the concave portion in the opposing portion is not filled with the filling medium whose refractive index is larger than 1 but smaller than the refractive index of the core layer, and it is filled with the air which refractive index is 1.

FIG. 6 is a graph showing calculated results of the reflection loss. FIG. 7 is a graph showing calculated results of the coupling loss. FIG. 8 is a graph showing examined results of the total loss that is obtained by adding both the reflection loss and the coupling loss. These examined results were derived by the simulation executed based on the model shown in FIG. 3, and show the results that are obtained by summing both the incident side and the emissive side. In the model shown in FIG. 3, for example, the coupling portion between the collimator portion 202 and the optical deflector element portion 203 on the incident side and the coupling portion between the optical deflector element portion 205 and the light converging portion 206 on the emissive side are assumed. Here, assume that the core layer of the two-dimensional lens and the core layer of the optical deflector element have the same refractive index n1 (=1.5702) and also the filling media with which the concave portions in respective coupling portions are filled have the same refractive index n2.

FIG. 6 shows a relationship between the refractive index n2 of the medium with which the concave portion between the opposing portions in the coupling portion is filled, and the reflection loss. As shown in an upper view of FIG. 6, the calculation is executed under the assumption that a reflection is generated at a boundary surface between the media with different refractive indexes. An ordinate of FIG. 6 denotes the reflection loss (dB) in a linear scale, and an abscissa thereof denotes the refractive index n2 of the medium, with which the concave portion between the opposing portions in the coupling portion is filled, in a linear scale.

As shown in FIG. 6, the reflection loss was smallest at a point where the refractive index n2 is equal to the refractive index n1. If the refractive index n2 is 1 (in the case of the comparative example), i.e., if in the concave portion between the opposing portions is filled with the air, such reflection loss was about −0.8 dB. If the refractive index n2 is 3, such reflection loss was about −1.8 dB.

Figure 7:
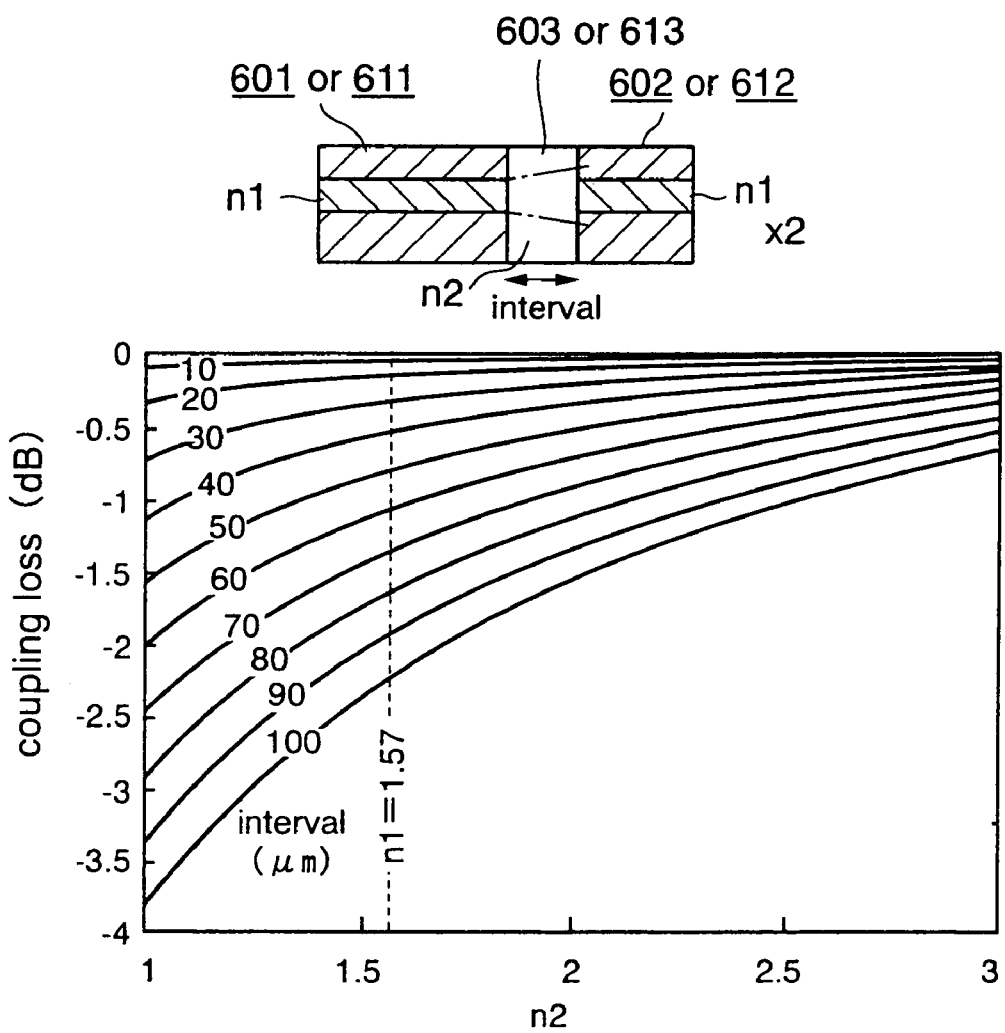
FIG. 7 is a graph showing calculated results of a coupling loss with respect to the refractive index of the filling medium while using an interval between end surfaces as a parameter, in the optical coupling portion as the first embodiment.

FIG. 7 shows a relationship between the refractive index n2 of the medium, with which the concave portion between the opposing portions is filled, and the coupling loss, while using an interval (μm) between the opposing portions as a parameter. An ordinate of FIG. 7 denotes the coupling loss (dB) in a linear scale, and an abscissa thereof denotes the refractive index n2 of the medium, with which the concave portion between the opposing portions is filled, in a linear scale.

As shown in FIG. 7, the coupling loss is increased larger as the interval between the opposing portions is widened, while the coupling loss is increased larger as the refractive index n2 is reduced lower. If the refractive index n2 is 1 (in the case of the comparative example) and the interval is 10 μm, the coupling loss was seldom generated, i.e., became about 0 dB. If the interval is 100 μm, the coupling loss was about −3.7 dB. Also, if the refractive index n2 is 1.57 and the interval is 10 μm, the coupling loss was seldom generated, i.e., became about 0 dB. If the interval is 100 μm, the coupling loss was about −2.4 dB. In addition, if the refractive index n2 is 3 and the interval is 10 μm, the coupling loss was seldom generated, i.e., became about 0 dB. If the interval is 100 μm, the coupling loss was about −0.7 dB.

FIG. 8 shows a relationship between the refractive index n2 of the medium, with which the concave portion between the opposing portions is filled, and the total loss derived by summing the reflection loss and the coupling loss, while using the interval (μm) between the opposing portions as the parameter. An ordinate of FIG. 8 denotes the total loss (dB) in a linear scale, and an abscissa thereof denotes the refractive index n2 of the medium, with which the concave portion between the opposing portions is filled, in a linear scale.

As shown in FIG. 8, like the change in the reflection loss with respect to the refractive index n2, the total loss was smallest at a point where the refractive index n2 is equal to the refractive index n1 or in the neighborhood that is higher than the refractive index n1. The total loss is increased as the interval is widened longer. If the refractive index n2 is 1 (in the case of the comparative example) and the interval is 10 μm, such total loss was about −1 dB. If the interval is 100 μm, the total loss was smaller than about −4 dB. Also, if the refractive index n2 is 1.57 and the interval is 10 μm, the total loss was seldom generated and was about 0 dB. If the interval is 100 μm, the total loss was about −2.4 dB. In addition, if the refractive index n2 is 3 and the interval is 10 μm, the total loss was about −1.9 dB. If the interval is 100 μm, the total loss was about −2.5 dB. It is appreciated that, in order to suppress the total loss within about −0.5 dB, the interval must be set to 40 μm or less. If the interval is 40 μm, the selectable range of the refractive index n2 was about 1.6 to 1.8. If the interval is narrower than this interval, the selectable range of the refractive index n2 was expanded. Also, if the interval is 10 μm, the selectable range of the refractive index n2 was about 1.1 to 2.2.

As described above, according to the first embodiment of the present invention, both the first and second optical waveguides 601 or 611 and 602 or 612 are arranged to oppose their end surfaces from which the overlying cladding layers 601c, 611c, 602c, 612c to the underlying cladding layers 601a, 611a, 602a, 612a are exposed, and a portion between the mutual end surfaces is filled with the filling medium 603 or 613 with the refractive index n2.

Although explained in detail in a second embodiment, in order to construct such structure, for example, the overlying cladding layers 601c, 611c, 602c, 612c to the underlying cladding layers 601a, 611a, 602a, 612a, which are laminated continuously, are etched continuously. Thus, the first and second optical waveguides 601 or 611 and 602 or 612 are formed to oppose mutually their end surfaces from which the overlying cladding layers 601c, 611c, 602c, 612c to the underlying cladding layers 601a, 611a, 602a, 612a are exposed. Then, a portion between the opposed end surfaces is filled with the filling medium 603 or 613.

In this case, since the polishing step set forth in the prior application (Patent Application No. 2001-332169) is not needed, simplification of the steps can be attained. Also, since film thicknesses of the core layers 601b, 611b, 602b, 612b, etc. are decided at the time of film formation, control of the film thickness can be facilitated.

Also, a portion between the opposed end portions is filled with the filling medium 603 or 613 with the refractive index n2. Therefore, as shown in FIG. 8, if the refractive index n2 is selected appropriately, the loss can be reduced in contrast to the case where a portion between the end surfaces is filled with the air layer (n2=1), and also the margin for the interval between the end surfaces can be delivered.

In this case, in the first embodiment, materials with the same refractive index n1 are employed as the core layers 601b, 611b, 602b, 612b of the first and second optical waveguides 601 or 611 and 602 or 612. But the core layers with the different refractive indexes (nc1,nc2) may be employed. In this case, the refractive index ni12 of the filling medium 603 or 613 is set such that the total loss in the optical coupling portion can be reduced lower than the predetermined value. In addition, in the application of the optical switch module, it is preferable that nc1, nc2>ni12>1 should be satisfied in the case of two-dimensional convex lens. As such material, the fluororesin whose refractive index is lower than that of the quartz is employed. Also, it is preferable that nc1, nc2<ni12 should be satisfied in the case of two-dimensional concave lens. As such material, the epoxy resin whose refractive index is higher than that of the quartz, or the like is employed.

Second Embodiment

Next, a method of forming coupling portions between two-dimensional convex lenses and the optical waveguides, which are similar to FIG. 4A, according to a second embodiment of the present invention will be explained with reference to FIGS. 9A to 9C hereinafter.

Figure 9A:
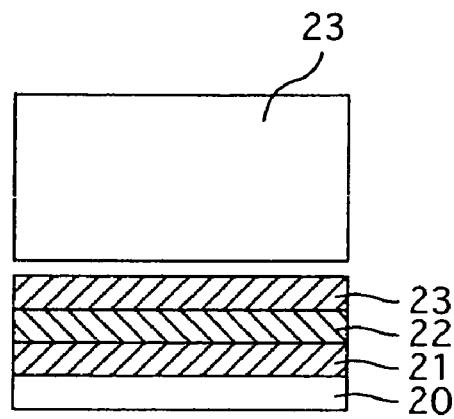
FIGS. 9A to 9C are sectional views, as lower views, showing a method of forming coupling portions between two-dimensional convex lenses and the optical waveguides, which are similar to FIG. 4A, according to a second embodiment of the present invention, and plan views, as upper views, showing the same.
Figure 9B:
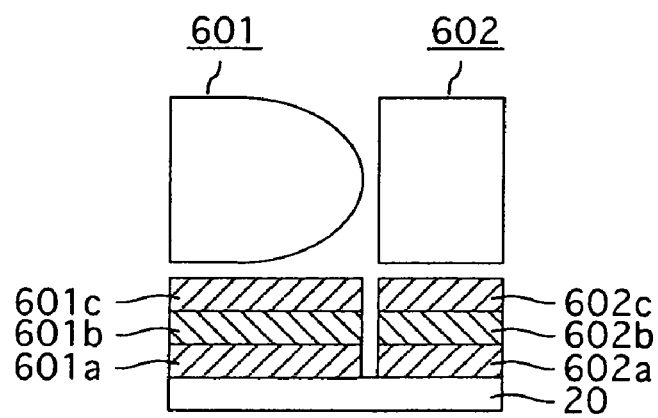
Figure 9C:
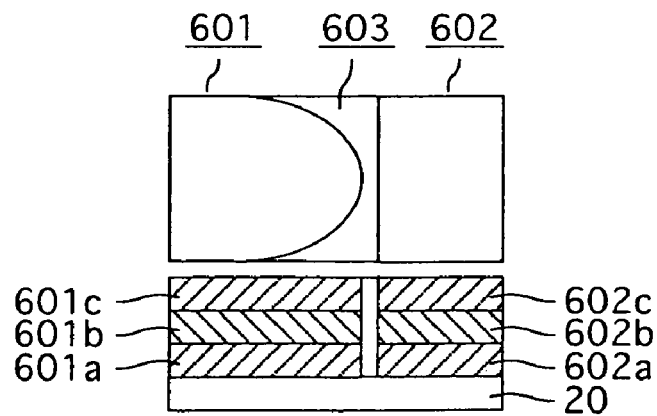

In each of FIGS. 9A to 9C, an upper view is a plan view and a lower view is a sectional view.

First, as shown in FIG. 9A, an $SiO_2$ film 21 with a refractive index 1.44 as an underlying cladding layer, an $SiO_2$ film 22 with a refractive index 1.45 as a core layer, and an $SiO_2$ film 23 with a refractive index 1.44 as an overlying cladding layer are deposited sequentially on a quartz substrate 20 by the CVD (Chemical Vapor Deposition) method. Adjustment of the refractive index is executed by controlling the film forming conditions.

Then, as shown in FIG. 9B, the two-dimensional lens 601 having a convex end surface and the optical waveguide 602 having the flat end surface are formed at a distance by the reactive ion etching while using a photoresist mask (not shown). Thus, the convex end surface of the two-dimensional lens 601 and the flat end surface of the optical waveguide 602 are opposed to each other at an interval. The underlying cladding layer 601a, the core layer 601b, and the overlying cladding layer 601c are exposed from the end surface of the two-dimensional lens 601. The underlying cladding layer 602a, the core layer 602b, and the overlying cladding layer 602c are exposed from the end surface of the optical waveguide 602.

Then, as shown in FIG. 9C, a portion between the opposing portions is filled with the fluororesin (filling medium) 603 with the refractive index n2 (ni12) that is selected in the range, in which the total loss of the reflection loss and the coupling loss can be reduced smaller than the predetermined value when the light propagates from the two-dimensional lens 601 to the optical waveguide 602 through the opposing portions. In this case, it is preferable that, if the above coupling structural body is applied to the optical switch module, the value of the refractive index n2 (ni12) should be set lower than the refractive index n1 to collimate the light by the two-dimensional concave lens 601 in the collimator portion and to converge the light in the light converging portion.

Thus, the coupling structural body of the optical parts, one of which is the two-dimensional convex lens, is completed.

Next, a method of forming coupling portions between the optical waveguides and two-dimensional concave lenses, which are similar to FIG. 4B, according to a second embodiment of the present invention will be explained with reference to FIGS. 10A to 10C hereinafter. In each of FIGS. 10A to 10C, an upper view is a plan view and a lower view is a sectional view.

Figure 10A:
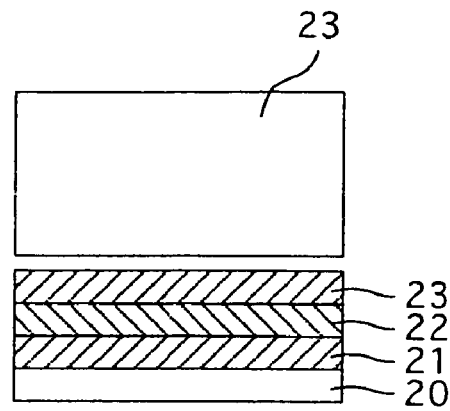
FIGS. 10A to 10C are sectional views, as lower views, showing a method of forming coupling portions between two-dimensional concave lenses and the optical waveguides, which are similar to FIG. 4B, according to the second embodiment of the present invention, and plan views, as upper views, showing the same.
Figure 10B:
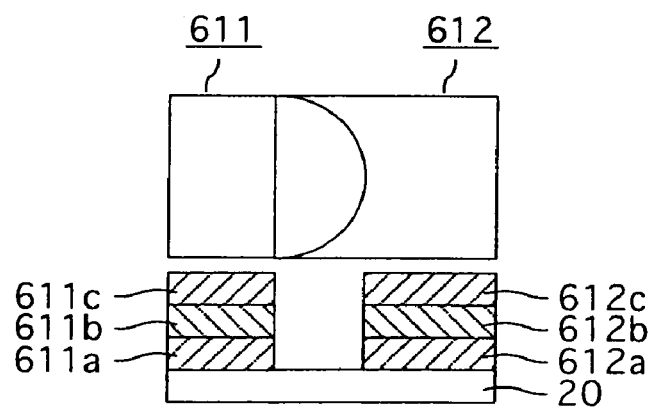
Figure 10C:
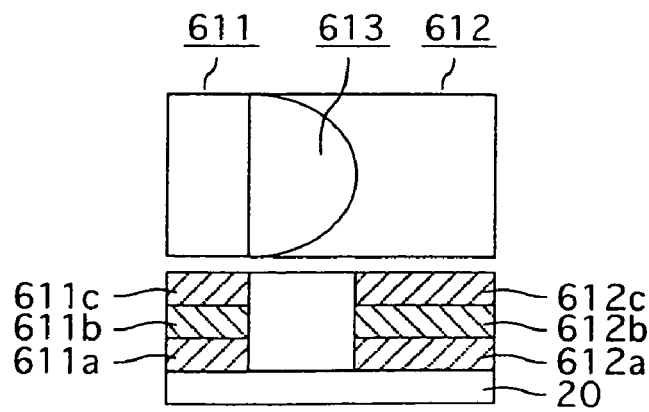

As shown in FIGS. 10A to 10C, the optical waveguide 611 and the two-dimensional concave lens 612 are formed at a distance. Such parts can be formed in the same manner as that in FIGS. 9A to 9C. Thus, a structure in which the optical waveguide 611 and the two-dimensional concave lens 612 are arranged to oppose their end surfaces mutually is obtained. The underlying cladding layer 611a, the core layer 611b, and the overlying cladding layer 611c are exposed from the end surface of the optical waveguide 611. The underlying cladding layer 612a, the core layer 612b, and the overlying cladding layer 612c are exposed from the end surface of the two-dimensional concave lens 612.

Then, as shown in FIG. 10C, a portion between the opposing portions is filled with the epoxy resin (filling medium) 613 with the refractive index n2 (ni12 (ni(j,k))) that is selected in the range, in which the total loss of the reflection loss and the coupling loss can be reduced smaller than the predetermined value when the light propagates from the optical waveguide 611 to the two-dimensional concave lens 612 through the opposing portions. In this case, it is preferable that, in the application of the optical switch module, normally the value of the refractive index n2 (ni12) should be set higher than the refractive index n1 of the core layer 611b, 612b to collimate the light by the two-dimensional concave lens 612 in the collimator portion and to converge the light in the light converging portion.

Thus, the coupling structural body of the optical parts, one of which is the two-dimensional concave lens 612, is completed.

As described above, according to the second embodiment, the two-dimensional concave lens 601 or 612 and the optical waveguide 602 or 611, whose end surfaces are opposed to put the opposing portions therebetween, are formed by etching successively the laminated structure as the optical waveguide from the overlying cladding layer 23 to the underlying cladding layer 21. Then, a portion between the opposing portions is filled with the resin 603, 613 with the refractive index n2 (ni12) that is selected in the range, in which the total loss of the reflection loss and the coupling loss can be reduced smaller than the predetermined value when the light propagates through the coupling portion.

As a result, simplification of the manufacturing steps can be attained, and the coupling efficiency can be improved. Thus, the loss caused by the reflection at interfaces of the optical coupling portion can be reduced.

Third Embodiment

Next, a third embodiment of the present invention will be explained with reference to FIGS. 11A to 11D and FIGS. 12A to 12D hereunder.

Figure 11A:
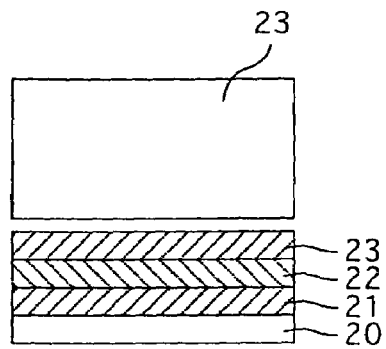
FIGS. 11A to 11D are views showing a method of forming coupling portions between two-dimensional convex lenses and the optical waveguides according to a third embodiment of the present invention, wherein their upper views are plan views and their lower views are sectional views.
Figure 11B:
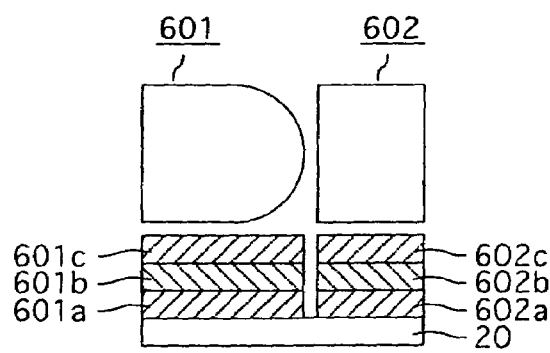
Figure 11C:
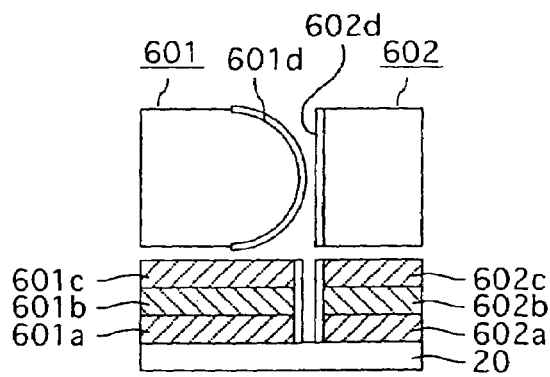
Figure 11D:
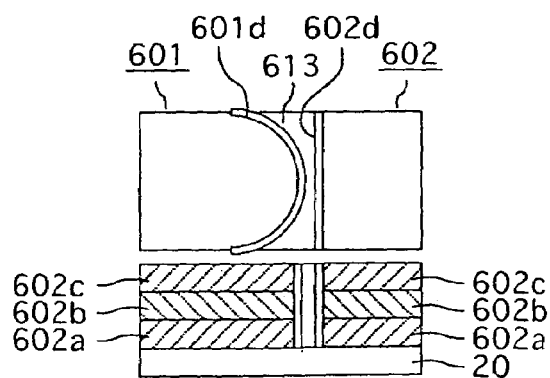

An upper view of FIG. 11D is a plan view showing coupling portions between two-dimensional convex lenses and the optical waveguides according to the third embodiment, and a lower view of FIG. 11D is a sectional view showing the same.

In the third embodiment, a difference from the structures of the coupling portions in the first and second embodiments resides in that respective end surfaces of the two-dimensional lens 601 and the optical waveguide 602 in the optical coupling portion are covered with films (coating mediums) 601d, 602d made of material having the intermediate refractive index ni1 (nij) or ni2 (nik) between the refractive index n1 (nc1(ncj), nc2(nck)) of the core layers 601b, 602b in the two-dimensional lens 601 and the optical waveguide 602 and the refractive index n2 (ni12(ni(j,k))) of the medium 603 with which a portion between the opposing portions is filled, respectively. It is desired that the films 601d, 602d for covering the end surfaces should be formed sufficiently thin rather than the interval between the opposing portions. Preferably, the thickness should be set smaller than several µm.

As shown in FIGS. 11A and 11B, in the manufacturing method, the two-dimensional convex lens 601 and the optical waveguide 602 are formed to put the opposing portions therebetween. In this case, the same steps as those in FIGS. 9A and 9B are applied. Thus, the structure in which the two-dimensional lens 601 and the optical waveguide 602 are arranged to oppose their end surfaces mutually is obtained. The underlying cladding layer 601a, the core layer 601b, and the overlying cladding layer 601c are exposed from the end surface of the two-dimensional lens 601. The underlying cladding layer 602a, the core layer 602b, and the overlying cladding layer 602c are exposed from the end surface of the optical waveguide 602.

Then, as shown in FIG. 11C, the resin having the intermediate refractive index n3 (ni1(nij), ni2(nik)) between the refractive index n2 (ni12(ni(j,k))) of the resin 603, with which a portion between the opposing portions is filled later, and the refractive index n1 (nc1(ncj), nc2(nck)) of the core layers 601b, 602b is selected. Then, the thin resin film (coating medium) 601d, 602d for covering the end surface of the two-dimensional lens 601 and the end surface of the optical waveguide 602 respectively are formed by coating the resin by virtue of the coating method.

Then, as shown in FIG. 11D, a portion between the end surface of the two-dimensional lens 601 and the end surface of the optical waveguide 602, which are covered with the thin resin films 601d, 602d, is filled with the resin (filling medium) 603 with the refractive index n2 that is lower than the refractive index n3 of the thin resin films 601d, 602d, respectively. Thus, the coupling structural body of the optical parts, one of which is the two-dimensional convex lens, is completed.

Next, coupling portions between two-dimensional concave lenses and the optical waveguides and a method of forming the same according to the third embodiment will be explained with reference to FIGS. 12A to 12D hereinafter. In each of FIGS. 12A to 12D, an upper view is a plan view and a lower view is a sectional view.

Figure 12A:
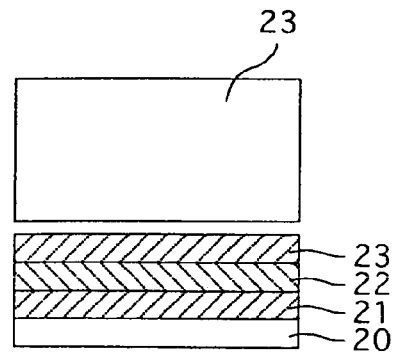
FIGS. 12A to 12D are views showing a method of forming coupling portions between two-dimensional concave lenses and the optical waveguides according to the third embodiment of the present invention, wherein their upper views are plan views and their lower views are sectional views.
Figure 12B:
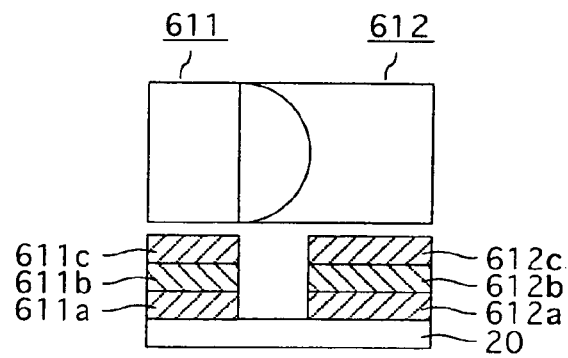
Figure 12C:
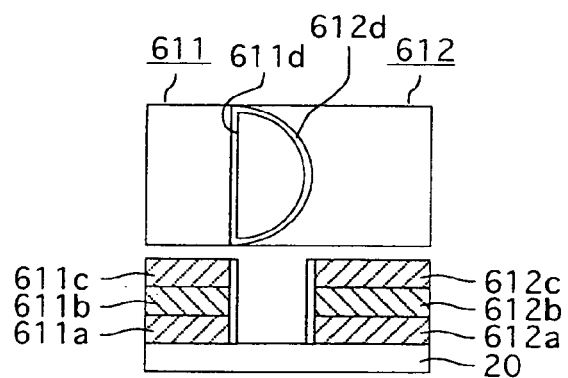
Figure 12D:
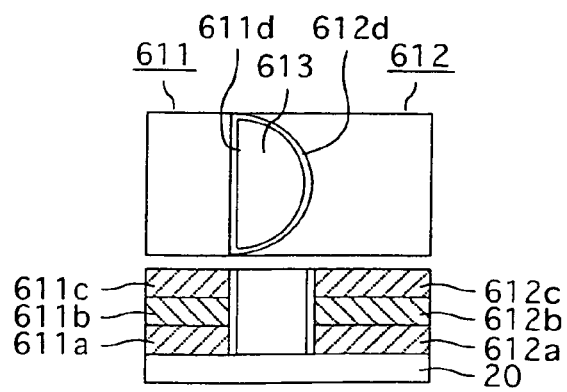

In a structure in FIG. 12D, a difference from the structure in FIG. 11D is that the two-dimensional lenses 612 have the concave shape.

As shown in FIGS. 12A and 12B, in the manufacturing method, first the first optical waveguide layer 611 and the second optical waveguide layer 612 are formed such that their end surfaces are opposed mutually. The same steps as those in FIGS. 10A and 10B are applied as the forming steps. The overlying cladding layers 611c, 612c to the underlying cladding layers 611a, 612a are exposed from respective end surfaces of the formed opposing portions.

Then, as shown in FIG. 12C, respective end surfaces of the optical waveguide 611 and the two-dimensional lens 612 in the coupling portion are covered with the thin resin films (covering mediums) 611d, 612d having the intermediate refractive index n3 (ni1(nij) or ni2(nik)) between the refractive index n1 (nc1(ncj), nc2(nck)) of the core layers 611b, 612b of the optical waveguide 611 and the two-dimensional lens 612 and the refractive index n2 (ni12(ni(j,k))) of the filling medium 613, with which a portion between the opposing portions is filled later.

Then, as shown in FIG. 12D, the resin (filling medium) 613 with the refractive index n2 that is higher than the refractive index n3 of the resin films 611d, 612d, which are coated on the end surfaces, is selected, and the portion is filled therewith. Thus, the coupling structural body of the optical parts, one of which is the two-dimensional concave lens, is completed.

As described, according to the third embodiment of the present invention, since the opposing portions between respective end surfaces of the two-dimensional lenses 601, 612 and the optical waveguides 602, 611 in the coupling portion are filled with the filling mediums 603, 613, the coupling loss and the reflection loss can be reduced. In addition, since their end surfaces are covered with the thin resin films 601d, 602d, 611d, 612d and also the refractive index n3 is close to the refractive indexes n1 of the core layers rather than the refractive indexes n2 of the filling mediums 603, 613, the reflection loss can be reduced much more.

Here, the core layers having the same refractive index (n1) respectively are employed as the core layers of the first and second optical waveguide layers 601, 611, 602, 612. But the core layers with different refractive indexes (ncj, nck) may be employed. In this case, the refractive indexes ni(j,k) of the filling mediums 603, 613 and the refractive indexes nij, nik of the coating mediums 601d, 611d, 602d, 612d are set as ncj>nij, nck>nik, nij, nik>ni(j,k) in the case of the two-dimensional convex lens, and also are set as ncj<nij, nck<nik, nij, nik<ni(j,k) in the case of the two-dimensional concave lens.

Fourth Embodiment

Next, a fourth embodiment of the present invention will be explained with reference to FIG. 13 and FIG. 14 hereunder.

Figure 13:
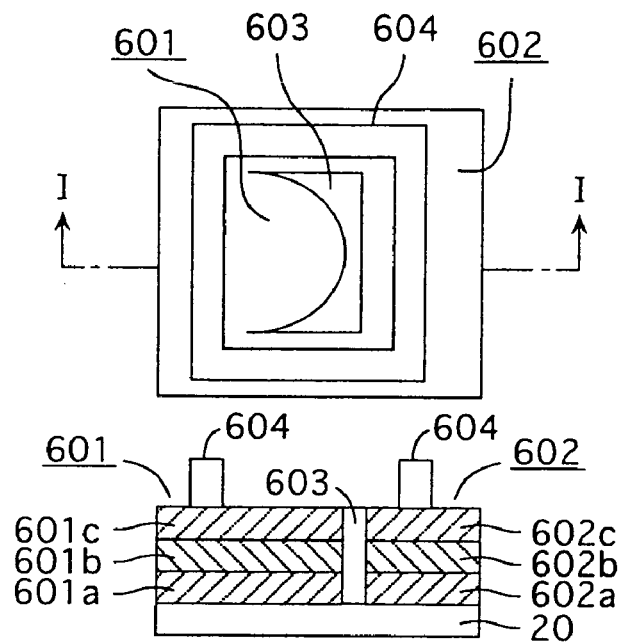
FIG. 13 is a plan view, as an upper view, showing a coupling portion between two-dimensional lenses and the optical waveguides according to a fourth embodiment of the present invention, and a sectional view, as a lower view, taken along a I—I line in the upper view.

An upper view of FIG. 13 is a plan view showing a coupling portion between two-dimensional convex lenses and the optical waveguides according to the fourth embodiment, and a lower view of FIG. 13 is a sectional view taken along a I—I line in the upper view.

If the resin (filling medium) 603 filled in the opposing portions, as explained in the first to third embodiments, has the fluidity, it is possible that such resin flows out to the periphery. Therefore, as shown in FIG. 13, a convex portion 604 for preventing the flowout of the resin 603 to the peripheral portion may be formed to surround the opposing portions in FIG. 9C. As the convex portion 604, an insulating deposited film, coated film, or tape-like pasted film may be employed.

Figure 14:
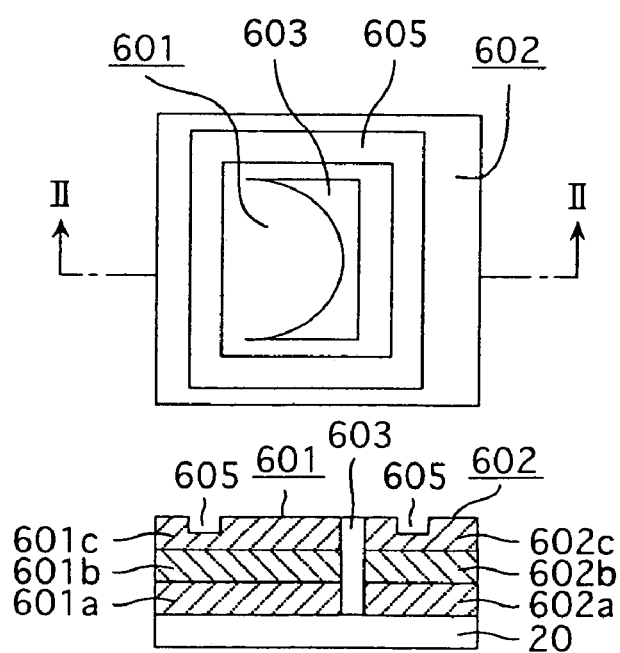
FIG. 14 is a plan view, as an upper view, showing another coupling portion between two-dimensional lens and the optical waveguide according to the fourth embodiment of the present invention, and a sectional view, as a lower view, taken along a II—II line in the upper view.

An upper view of FIG. 14 is a plan view showing another coupling portion between the two-dimensional convex lens and the optical waveguide according to the fourth embodiment, and a lower view of FIG. 14 is a sectional view taken along a II—II line in the upper view.

Similarly, if the resin (filling medium) 603 filled in the opposing portions has the fluidity, as shown in FIG. 14, a stripe concave portion 605 for storing the resin 603, which is going to flow out to the peripheral portion, therein may be formed to surround the opposing portions in FIG. 9C. Thus, the flowout of the resin 603 into the peripheral portion of the opposing portions can be prevented. As the concave portion 605, a stripe-like grove formed by etching the overlying cladding layers 601c, 602c, or the like may be employed.

Figure 15A:
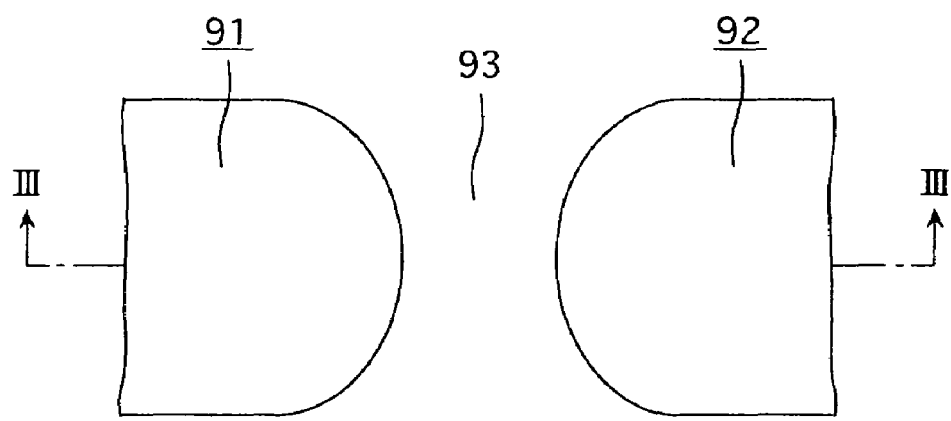
FIG. 15A is a plan view showing a coupling portion between two-dimensional convex lenses to explain a fifth embodiment of the present invention.

In this case, in the above first to fourth embodiments, the present invention is applied to the coupling portion between the two-dimensional convex or concave lenses 601, 612 and the optical waveguides 602, 611. However, the present invention can be applied to the coupling portion between the opposing two-dimensional convex lenses or the coupling portion between the opposing two-dimensional concave lenses, as shown in FIGS. 15A and 15B.

Fifth Embodiment

Figure 15B:
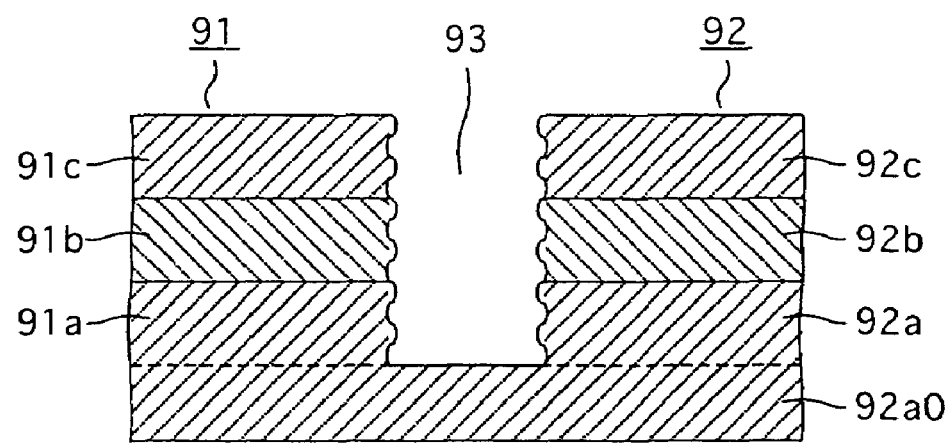
FIG. 15B is a sectional view taken along a III—III line in FIG. 15A.

Like the above first to fourth embodiments, if a laminated structure consisting of the underlying cladding layer, the core layer, and the overlying cladding layer is etched by the reactive ion etching, it is possible that, as shown in FIG. 15B, an unevenness of about 100 nm is produced on the formed end surface. FIG. 15A is a plan view showing the coupling portion between such two-dimensional convex lenses 91, 92, and FIG. 15B is a sectional view taken along a III—III line in FIG. 15A. The two-dimensional lens 91 made of a laminated structure consisting of an underlying cladding layer 91a, a core layer 91b, and an overlying cladding layer 91c and the two-dimensional lens 92 made of a laminated structure consisting of an underlying cladding layer 92a, a core layer 92b, and an overlying cladding layer 92c are formed on a substrate 92a0 to oppose their end surfaces to each other. FIG. 15B shows the state that the unevenness is generated on respective end surfaces formed by the reactive ion etching.

When the light propagates through interfaces of the uneven portions that have different refractive indexes on both sides of the uneven portion, such light is scattered at the interfaces of the uneven portions. Thus, because of generation of such scattered light, the loss in the coupling structural body of optical parts is increased.

In following embodiments, a structure that is effective to reduce the propagation loss of the light such as the reflection loss, the coupling loss, etc. in such case will be explained.

Figure 16:
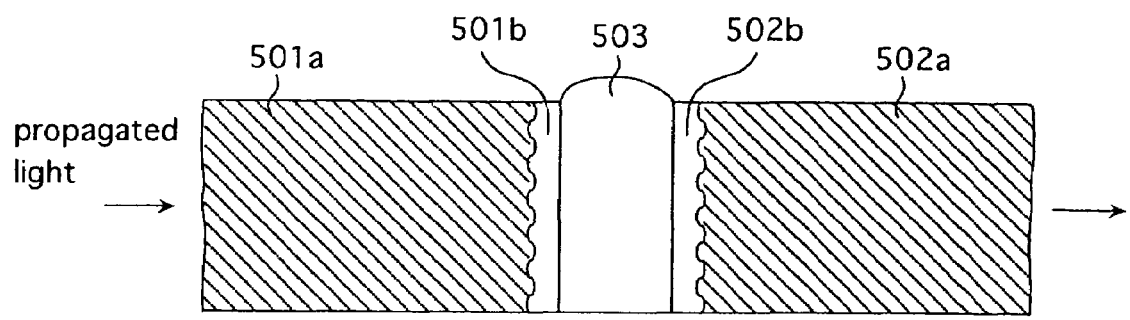
FIG. 16 is a sectional view showing a configuration of a coupling structural body of optical parts according to the fifth embodiment of the present invention.

FIG. 16 is a sectional view showing the coupling portion between the optical waveguides as a part of the optical switch module having such structure, according to the fifth embodiment of the present invention.

In the fifth embodiment, optical waveguides 501a, 502a are patterned by the etching, but such optical waveguides 501a, 502a are not covered with the cladding layer. Respective end surfaces of the optical waveguides 501a, 502a in the opposing portions are covered with films (coating mediums) 501b, 502b made of the material with the same refractive indexes ni1, ni2 (nij, nik) as the refractive indexes nc1, nc2 (ncj, nck) of the optical waveguides 501a, 502a. Then, a filling medium 503 made of the material with the low refractive index ni12 (ni(j,k)) is filled in the concave portion of the opposing portions.

Therefore, since both end surfaces of the opposing portions become smooth, the scattering of the light, which propagates through the optical waveguides 501a, 502a, at the end surfaces can be prevented. Therefore, the loss due to the reflection and the coupling loss can be reduced.

Also, since the opposing portions whose end surfaces become smooth by the coating mediums 501b, 502b is filled with the filling medium with the refractive index ni12 which is lower than the refractive indexes nc1, nc2 of the optical waveguides 501a, 502a, the loss due to the reflection can be reduced. Therefore, the propagation loss of the light can be reduced.

Sixth Embodiment

Next, a sixth embodiment of the present invention will be explained with reference to FIGS. 17A and 17B hereunder.

Figure 17A:
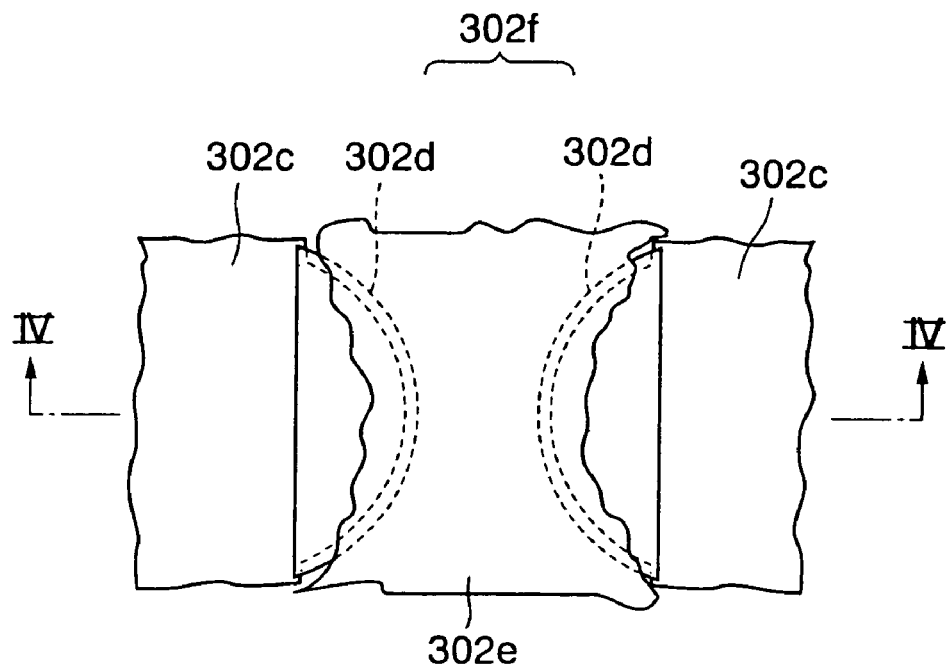
FIG. 17A is an enlarged plan view showing a configuration of a collimator portion or a light converging portion of an optical switch module according to a sixth embodiment of the present invention.
Figure 17B:
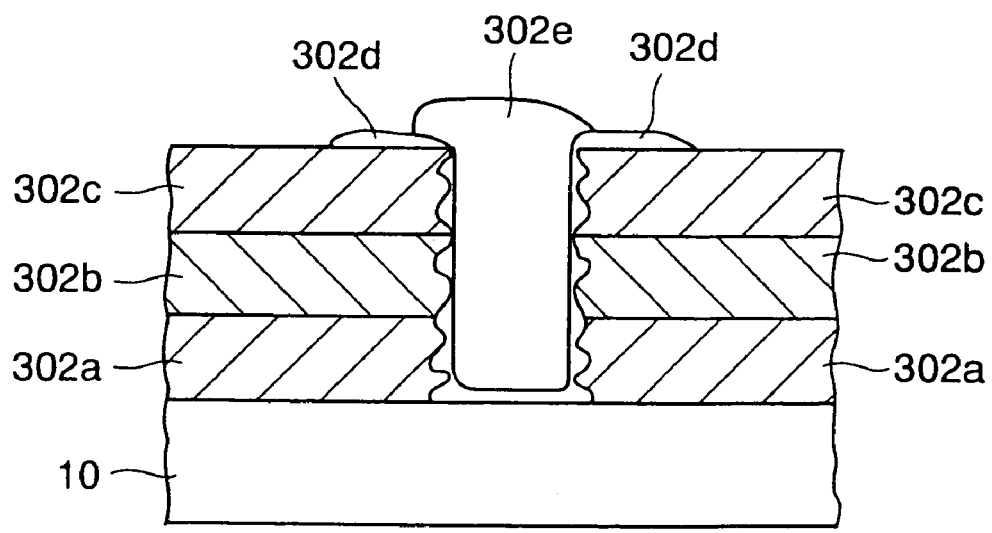
FIG. 17B is a sectional view taken along a IV—IV line in FIG. 17A.

FIG. 17A is a plan view showing a collimator portion or a light converging portion of an optical switch module according to a sixth embodiment of the present invention, and is an enlarged plan view of the two-dimensional lens portion. FIG. 17B is a sectional view taken along a IV—IV line in FIG. 17A.

In the sixth embodiment, differences from the fifth embodiment are that an underlying cladding layer 302a and an overlying cladding layer 302c are provided under and on a core layer 302b and two two-dimensional convex lenses 302b are arranged at an interval to oppose to each other. In this case, the emissive-side end surface of the two-dimensional convex lens 302b on the left side and the incident-side end surface of the two-dimensional convex lens 302b on the right side are covered with a thin resin film (coating medium) 302d made of the material with the refractive indexes nij, nik, which are the same as the refractive indexes ncj, nck of the core layers 302b, respectively. In addition, the opposing portions between the end surfaces of the two-dimensional convex lenses 302b are filled with a filling medium 302e made of the material with the refractive index ni22(ni(j,k)) which is lower than the refractive indexes ncj, nck of the core layers 302b.

As described above, according to the optical switch module of the sixth embodiment, the end surfaces of the two-dimensional convex lenses 302b formed by the reactive ion etching in the coupling portion are covered with the coating medium 302d with the refractive indexes nij, nik, which are equal to the refractive indexes ncj, nck of the core layers 302b that are exposed from the end surfaces.

Since the refractive indexes nij, nik of the coating medium 302d are equal to the refractive indexes ncj, nck of the core layers 302b that are exposed from the end surfaces, substantially smooth end surfaces of the two-dimensional convex lenses 302b can be obtained by averaging the unevenness of the end surfaces by virtue of the coating medium 302d. Therefore, the scattering of the light at the end surfaces of the two-dimensional lenses 302b can be prevented, and thus the loss due to the reflection and the coupling loss can be reduced.

Also, since the opposing portions whose end surfaces are made smooth by the coating medium 302d are filled with the filling medium with the refractive index ni22(ni(j,k)), which is lower than the refractive indexes of the core layers 302b, the loss due to the reflection can be reduced and also the light that is transmitted through the two-dimensional lenses can be collimated. Therefore, the propagation loss of the light can be reduced.

Seventh Embodiment

Next, a seventh embodiment of the present invention will be explained with reference to FIGS. 18A and 18B hereunder.

Figure 18A:
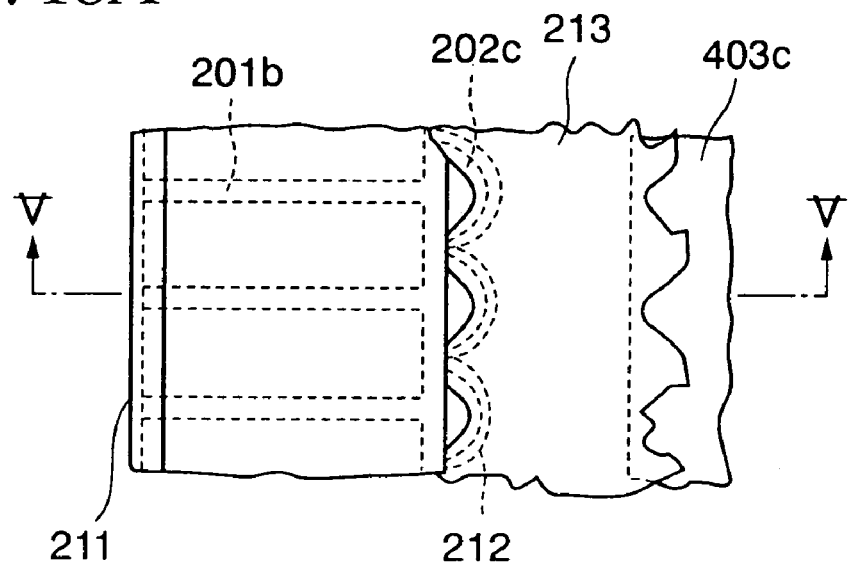
FIG. 18A is a plan view showing a configuration of a coupling structural body of optical parts having a collimator portion of the optical switch module according to a seventh embodiment of the present invention.
Figure 18B:
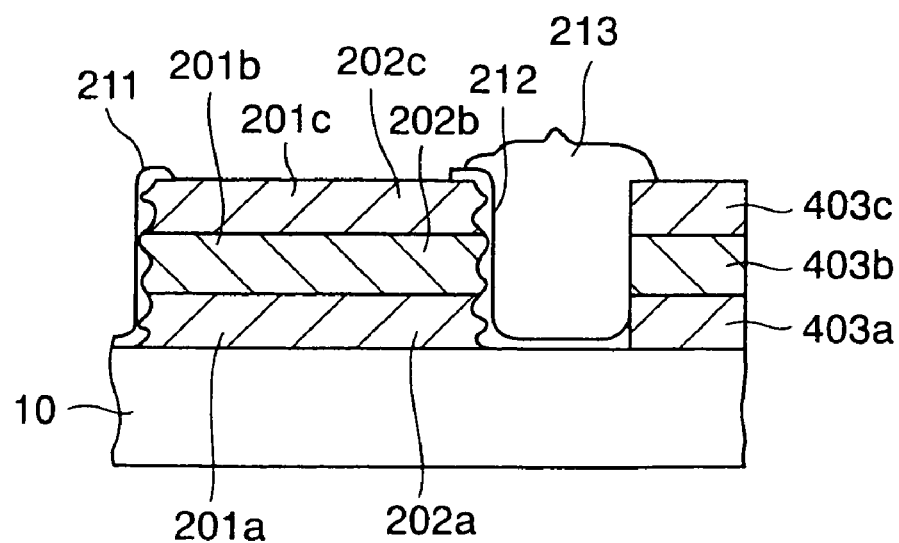
FIG. 18B is a sectional view taken along a V—V line in FIG. 18A.

FIG. 18A is a plan view showing a part of an optical switch module according to a seventh embodiment of the present invention, and FIG. 18B is a sectional view taken along a V—V line in FIG. 18A.

In the seventh embodiment, a difference from the fifth and sixth embodiments is that a structure in which the incident-side end surface of the optical waveguide (core layer) 403b is smooth without unevenness is provided. Such structure can be obtained in the case that photosensitive material is employed as the material of the optical waveguide 403b, and then the optical waveguide 403b is formed by the patterning using the photo process and only the two-dimensional lenses 202b are formed by the reactive ion etching, for example.

In this case, the emissive-side end surface of the two-dimensional lens 202b is covered with a resin film 212 with the refractive index ni2(nij), which is equal to the refractive index nc2(ncj) of the core layer 202b, to make the unevenness of the end surface smooth. However, since the incident-side end surface of the optical waveguide 403b that opposes to the two-dimensional lens 202b is originally smooth without unevenness, such end surface is not covered with the coating medium, which has the same refractive index as that of the optical waveguide 403b to make the unevenness of the end surface smooth.

In addition, the opposing portions at which the end surface which is made smooth by the coating medium 212, and the smooth end surface of the optical waveguide 403b are opposed to each other are filled with a filling medium 213 with the refractive index ni24(ni(j,k)) which is lower than the refractive index of the core layer 202b.

As described above, according to the optical switch module of the seventh embodiment, out of both end surfaces of the two-dimensional convex lens 202b and the optical waveguide 403b in the coupling portion, only the end surface of the two-dimensional convex lens 202b formed by the reactive ion etching is covered with the coating medium 212 that has the same refractive index ni2 as the refractive index nc2 of the core layer 202b that is exposed from the end surface.

In this manner, since the unevenness of the end surface that is formed by the etching is uniformized by using the coating medium 212, the substantially smooth end surface of the two-dimensional lens 202b can be obtained. Therefore, since both end surfaces of the coupling portion are made smooth, the scattering of the light caused at the end surfaces of the two-dimensional lens 202b and the slab optical waveguide 403b can be prevented, and thus the loss due to the reflection and the coupling loss can be reduced.

Also, since the opposing portions whose end surfaces are made smooth by the coating medium 212 is filled with the filling medium 213 with the refractive index ni24(ni(j,k)) which is lower than the refractive index nc2 of the core layer 202b, the loss due to the reflection can be reduced and also the light that is transmitted through the two-dimensional lens 202b can be collimated. Therefore, the propagation loss of the light can be reduced.

Eighth Embodiment

Figure 19:
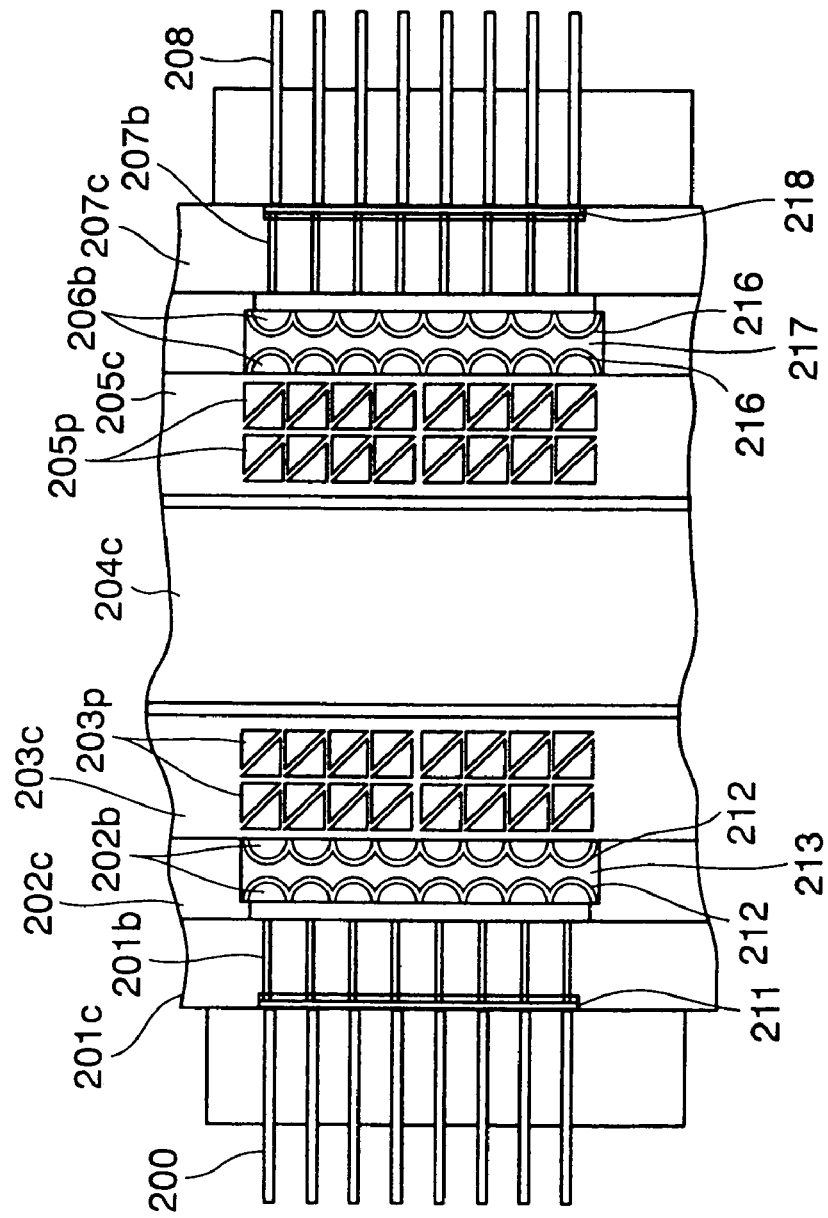
FIG. 19 is a plan view showing a configuration of an optical switch module according to an eighth embodiment of the present invention.
Figure 20A:
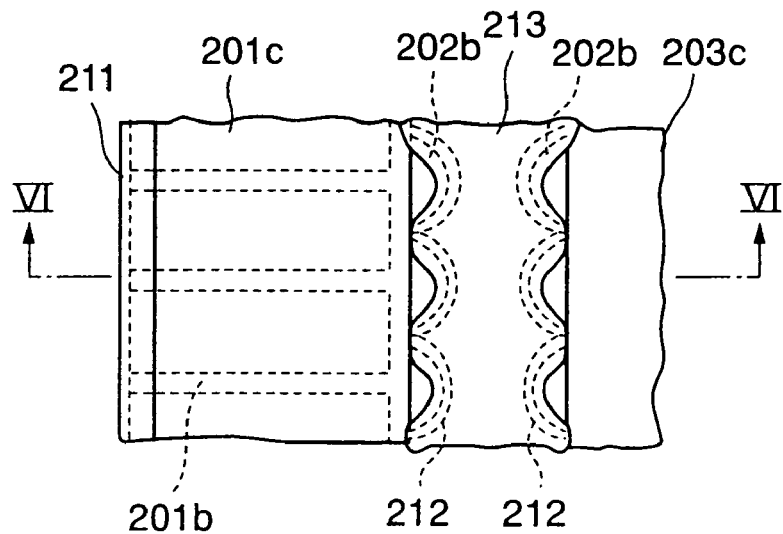
FIG. 20A is a plan view showing a configuration of a coupling structural body of an incident-side channel waveguide portion and a collimator portion of the optical switch module according to the eighth embodiment of the present invention.
Figure 20B:
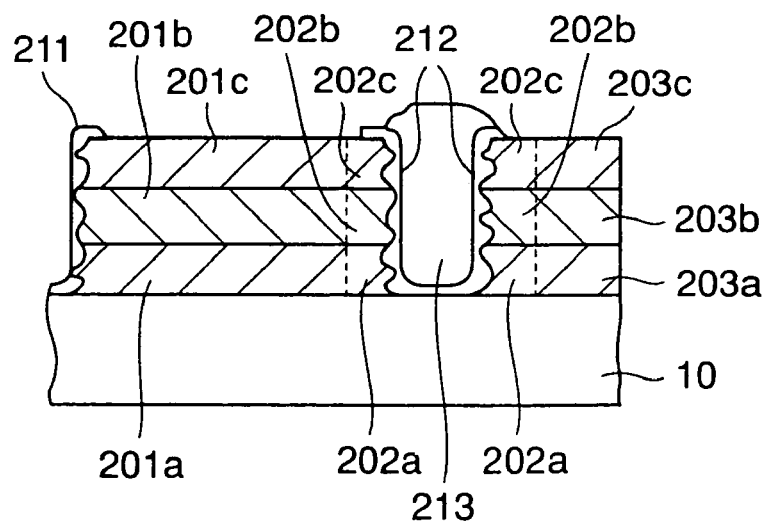
FIG. 20B is a sectional view taken along a VI—VI line in FIG. 20A.

Next, an example of an optical switch module according to an eighth embodiment of the present invention is shown in FIG. 19 and FIGS. 20A and 20B. FIG. 19 is a plan view showing the optical switch module according to the eighth embodiment. FIG. 20A is a plan view showing a coupling portion between an incident-side channel waveguide portion and a two-dimensional lens of a collimator portion according to the eighth embodiment, and FIG. 20B is a sectional view taken along a VI—VI line in FIG. 20A.

Assume that, as explained in FIG. 3, the measures are applied to the coupling portions of respective optical parts of the incident-side channel waveguide portion 201, the collimator portion 202, the light converging portion 206, and the emissive-side channel waveguide portion 207. Such configuration is shown in FIG. 19. In this case, in FIG. 19, the same references as those in FIG. 3 denote the same constituent elements in FIG. 3. In addition, in FIG. 19, a reference 200 denotes an incident-side optical fiber, and a reference 208 denotes an emissive-side optical fiber.

As shown in FIGS. 20A and 20B, the incident-side channel waveguide portion 201 has a laminated structure that consists of a plurality of core layers 201b formed at an interval mutually to propagate the light mainly, and cladding layers 201a, 201c formed on and under the core layers 201b and on the left/right sides thereof. The laminated structure constitutes the optical waveguides each having the core layer 201b as the center. The refractive indexes nu1(nuj or nuk), no1(noj or nok) of the cladding layers 201a, 201c are set lower than the refractive index nc1 (ncj) of the core layer 201b such that the light that is propagated through the core layer 201b does not leak out to the surrounding portion. The incident-side end surface of the optical waveguide is covered with a coating medium 211 made of the material having the refractive index ni1 (nij) that is identical to the refractive index nc1 of the core layer 201b.

As shown in FIGS. 20A and 20B, the collimator portion 202 is constructed by the opposing two-dimensional convex lenses (collimator lenses) 202b. Each of the opposing two-dimensional convex lenses 202b has a laminated structure that consists of the core layer 202b made of the material with the refractive index nc2 (ncj,nck), which is identical to the refractive index nc1 of the core layer 201b in the incident-side channel waveguide portion 201, e.g., the quartz to propagate the light mainly, and cladding layers 202a, 202c formed on and under the core layers 202b and on the left/right sides thereof. Then, the emissive-side end surface and the incident-side end surface of the two-dimensional lenses 202b are covered with the coating medium 212 made of the resin having the refractive index ni2 (nij,nik) that is identical to the refractive index nc2 of the core layer 202b respectively. In addition, as shown in FIG. 19 and FIGS. 20A and 20B, a portion between the emissive-side end surface and the incident-side end surface of the opposing two-dimensional lenses 202b is filled with the filling medium 213 with the refractive index ni22(ni(j,k)). For example, the filling medium 213 is made of the material with the refractive index ni22, which is lower than the refractive index of the quartz, e.g., the fluororesin.

As shown in FIG. 19 and FIGS. 20A and 20B, the optical deflector element 203p constituting the incident-side optical deflector element portion 203 is constructed by one or plural prism pairs. Then, one prism pair is constructed by first and second upper electrodes formed on the laminated structure, which consists of a core layer 203b made of the material having the electrooptic effect, e.g., PZT and cladding layers 203a, 203c formed on and under the core layer 203b and on the left/right sides thereof, and first and second lower electrodes formed under the laminated structure. All the first and second upper electrodes and the first and second lower electrodes are shaped into a right triangle shape (wedge shape).

The first upper electrode and the first lower electrode are opposed mutually to put the laminated structure having the core layer 203b therebetween. The first upper electrode and the second upper electrode are arranged closely to oppose their hypotenuses mutually. The second upper electrode and the second lower electrode are opposed mutually to put the laminated structure therebetween. In this case, the laminated structure having the core layer 203b is common in respective prism pairs.

The common optical waveguide portion 204 has a laminated structure that consists of the slab waveguide (core layer) through which the light propagates mainly and the cladding layers formed around the slab waveguide. In FIG. 19, an uppermost overlying cladding layer 204c is shown.

As shown in FIG. 19, the optical deflector element 205p of the emissive-side optical deflector element portion 205 is constructed by one or plural prism pairs, which is similar to the incident-side optical deflector element 203p. Each prism pair is constructed by a pair of first electrodes (the first upper electrode and the first lower electrode) formed to put the laminated structure, which has the core layer and the cladding layers formed on and under the core layer and on the left/right sides thereof, therebetween and a pair of second electrodes (the second upper electrode and the second lower electrode). In FIG. 19, an uppermost overlying cladding layer 205c is shown.

As shown in FIG. 19, like the collimator portion 202, the convex light converging lenses 206b are opposed to each other in the light converging portion 206. The portion of the convex light converging lens 206b has a laminated portion that consists of the core layer 206b made of the same material as the core layer 201b, e.g., the quartz to propagate the light mainly and the cladding layers formed on and under the core layer and on the left and right sides thereof. Then, the end surfaces of the opposing light converging lenses are covered with a resin film (coating medium) 216 having the refractive index ni6(nij,nik), which is identical to the refractive index nc6(ncj,nck) of the core layer 206b, respectively. A portion between the end surfaces of the opposing light converging lenses is filled with a filling medium 217. For example, the filling medium 217 is formed of the material having the refractive index ni66(ni(j,k)) that is lower than the refractive index of the quartz, e.g., the fluororesin.

As shown in FIG. 19, the emissive-side channel optical waveguide portion 207 has the same laminated structure as the incident-side channel optical waveguide portion 201, in which the channel optical waveguides 207b are arranged at an interval mutually in the same number as the channel optical waveguides 201b. The emissive-side end surface of the channel optical waveguide 207b is covered with a coating medium 218 that is made of the material having the same refractive index ni7(nik) as the refractive index nc7 (nck) of the core layer 207b.

As described above, according to the optical switch module of the eighth embodiment, the end surfaces of respective coupling portions formed by the reactive ion etching are covered with the coating mediums 211, 212, 216, 218 having the refractive indexes ni1, ni2, ni6, ni7 (nij,nik), which are identical to the refractive indexes nc1, nc2, nc6, nc7 (ncj,nck) of the core layers that are exposed from the end surfaces.

Since the refractive index nij or nik of the coating medium is equal to the refractive index ncj or nck of the core layer that is exposed from the end surface, such coating medium can be regarded as the core layer with respect to the propagation of the light. Therefore, even if the unevenness is generated on the end surface of the optical waveguide, which is exposed from the opposing portions in the coupling portion by the reactive ion etching or the like, the substantially smooth end surface of the optical waveguide can be obtained by uniformizing the unevenness on the end surface with the coating medium. It results in preventing the scattering of the light, which propagates through the optical waveguide, at the end surface, and thus it leads to reduction of the loss due to the reflection and the coupling loss.

Also, in the collimator portion 202 and the light converging portion 206, the opposing portions whose end surfaces become smooth by the coating mediums 212, 216 is filled with the filling medium 213, 217 with the refractive index ni22, ni66(ni(j,k)) which is lower than the refractive index of the core layer. It leads to reduction of the loss due to the reflection can be reduced, and thus the propagation loss of the light.

In this case, in the eighth embodiment, the coupling structural body of optical parts of the present invention is provided to the collimator portion 202 and the light converging portion 206. As the case may be, the coupling structural body of optical parts may be provided to at least any one of these coupling portions.

The present invention is explained in detail with reference to respective embodiments as above. But the present invention is not limited to the examples that are particularly given in the above embodiments, and modifications of the above embodiment not to depart from the gist of the present invention are contained in the scope of the present invention.

As described above, according to the coupling structural body of optical parts of the present invention, the first and second optical waveguides are arranged to oppose their end surfaces from which the overlying cladding layer to the underlying cladding layer are exposed, and a portion between the mutual end surfaces is filled with the filling medium with the refractive index ni(j,k). Therefore, if the refractive index ni(j,k) is selected appropriately, the loss can be reduced in contrast to the case where a portion between the end surfaces is filled with the air layer (ni(i,k)=1), and also the margin can be delivered to the interval between the end surfaces.

Also, the above structure is constructed by forming the first and second optical waveguides, that are opposed in their end surfaces from which the overlying cladding layer to the underlying cladding layer are exposed, by steps of laminating the overlying cladding layer, the core layer, and the underlying cladding layer, and then etching continuously the overlying cladding layer to the underlying cladding layer, followed by filling the portion between the mutual end surfaces with the filling medium.

Therefore, since the polishing step required in the prior application is not needed, simplification of the steps can be attained. Also, the film thicknesses of the core layer, etc. are decided at the time of film formation, control of the film thicknesses can be facilitated.

Also, according to another coupling structural body of optical parts of the present invention, the end surfaces formed by the etching are covered with the coating medium with the refractive index nij or nik that is equal to the refractive index ncj or nck of the core layer that is exposed from the end surface.

Since the refractive index nij or nik of the coating medium is equal to the refractive index ncj or nck of the core layer that is exposed from the end surface, such coating medium can be regarded as the core layer with respect to the propagation of the light. Therefore, even if the unevenness is generated on the end surfaces of the first or second optical waveguide in the opposing portions by the etching, the substantially smooth end surface of the optical waveguide can be obtained by uniformizing the unevenness on the end surface by means of the coating medium. It results in preventing the scattering of the light, which propagates through the optical waveguide, at the end surface, and thus in reducing the loss due to the reflection and the coupling loss.

Also, the area that is next to the two-dimensional convex lenses whose end surfaces are made smooth by the coating mediums is filled with the filling medium with the refractive index ni(j,k), which is lower than the refractive index of the core layer. It leads to reducing the loss due to the reflection, and to collimating the light that is transmitted through the two-dimensional lenses. It results in reduction of the propagation loss of the light.

Ninth Embodiment

Figure 22:
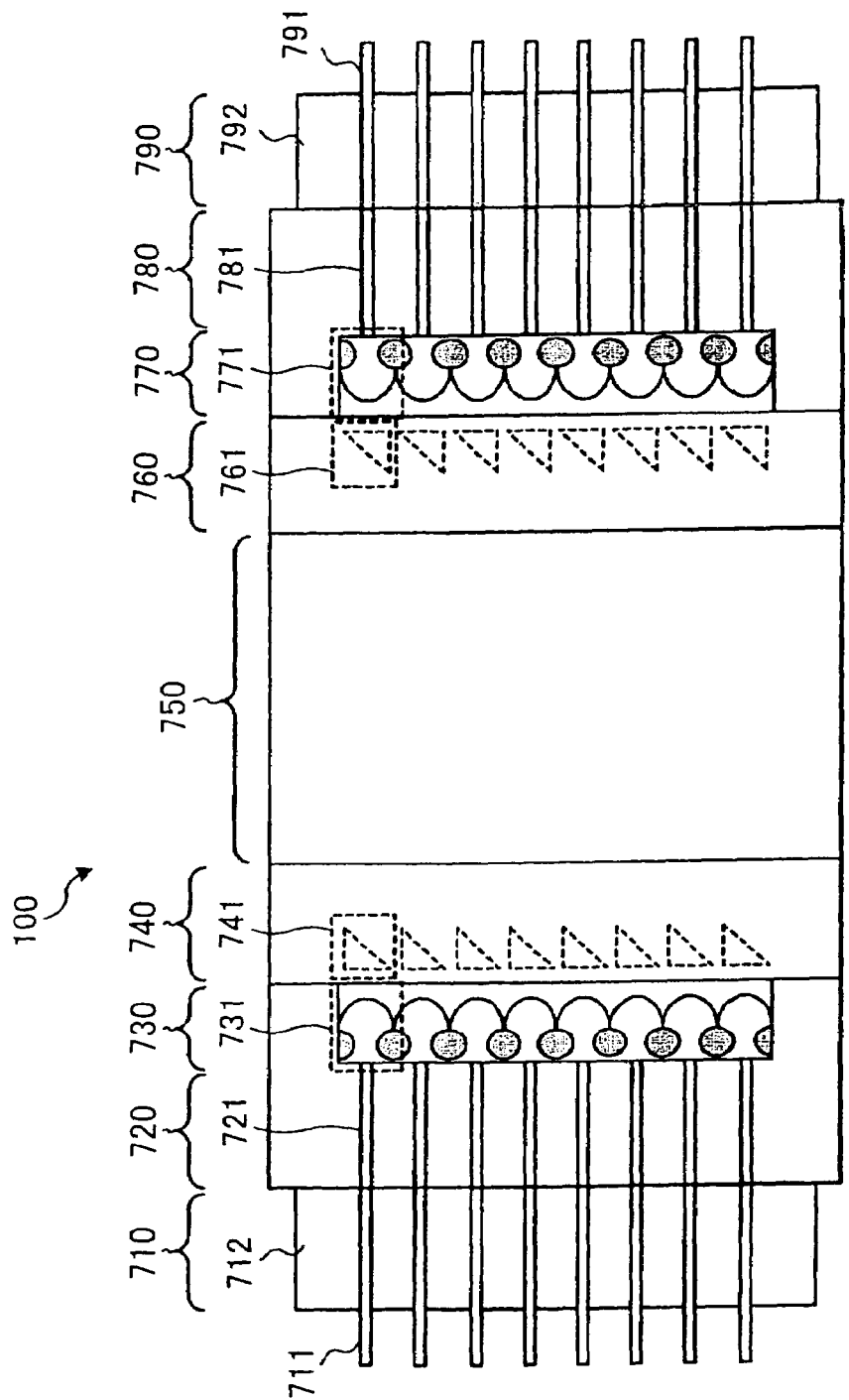
FIG. 22 is a plan view showing an example of a configuration of an optical switch module having the two-dimensional lens array according to the ninth embodiment of the present invention.

FIG. 22 is a plan view showing an example of a configuration of an optical switch module having a two-dimensional lens array according to a ninth embodiment of the present invention.

In FIG. 22, an optical switch 700 for switching optical signals on 8-input channels into 8-output channels as a whole to output them is shown as an example. This optical switch 700 is composed of an input-side optical fiber array 710, an optical input waveguide portion 720, a collimator portion 730, an input-side optical deflector element portion 740, a common optical waveguide 750, an output-side optical deflector element portion 760, a light converging portion 770, an optical output waveguide portion 780, and an output-side optical fiber array 790. In this case, in the optical switch 700, the collimator portion 730 and the light converging portion 770 correspond to a two-dimensional lens array of the present invention.

The input-side optical fiber array 710 is provided with a plurality of optical fibers 711 that correspond to respective input channels. The optical input waveguide portion 720 is provided with a plurality of optical input waveguides 721 that correspond to respective optical fibers 711. The collimator portion 730 are provided with a plurality of collimator lenses 731 that correspond to respective optical input waveguides 721. The input-side optical deflector element portion 740 is provided with a plurality of input-side optical deflector elements 741 that correspond to respective collimator lenses 731.

The optical signals are input into the input-side optical fiber array 710 from the outside via the optical fibers 711. Respective optical fibers 711 are aligned on the substrate 712. A plurality of V-shaped grooves are formed on a surface of the substrate 712. The optical fibers 711 are fitted into the grooves respectively. Emissive ends of the optical fibers 711 are connected to incident ends of respective optical input waveguides 721 in the optical input waveguide portion 720.

In the optical input waveguide portion 720, respective optical input waveguides 721 receive the optical signals from the optical fibers 711 on the incident side and then emit these optical signals to respective collimator lenses 731 in the collimator portion 730. In the collimator portion 730, respective collimator lenses 731 convert the optical signals, which are emitted from the optical input waveguides 721 on the incident side to spread radially, into parallel lights individually, and then allow the optical signals to be incident on respective input-side optical deflector elements 741 on the emissive side. In this case, a detailed structure of the collimator portion 730 will be explained with reference to FIG. 21 and FIGS. 23A and 23B later. In the input-side optical deflector element portion 740, respective input-side optical deflector elements 741 change the propagation directions of the optical signals emitted from the corresponding collimator lenses 731 on the incident side, and then emit such optical signals to the output-side optical deflector element portion 760 via the common optical waveguide 750.

The common optical waveguide 750 is constructed by slab waveguides, and transmits the optical signal that is emitted from the input-side optical deflector element portion 740 to the output-side optical deflector element portion 760.

In the output-side optical deflector element portion 760, a plurality of output-side optical deflector elements 761 that correspond to respective output channels are provided. In the light converging portion 770, a plurality of light converging lenses 771 that correspond to respective output-side optical deflector elements 761 are provided. In the optical output waveguide portion 780, a plurality of optical output waveguides 781 that correspond to respective light converging lenses 771 are provided. In the output-side optical fiber array 790, a plurality of optical fibers 791 that correspond to respective optical output waveguides 781 are provided.

In the output-side optical deflector element portion 760, respective output-side optical deflector elements 761 change the propagation directions of the optical signals, which are input from respective input-side optical deflector elements 741 via the common optical waveguide 750, and then cause the optical signals to input into respective light converging lenses 771 on the emissive side. In the light converging portion 770, respective light converging lenses 771 focus the optical signals, which are fed from respective output-side optical deflector elements 761, onto respective optical output waveguides 781 on the emissive side. In this case, the light converging portion 770 has the similar structure to the collimator portion 730, and details of the inner structure will be described later. In the optical output waveguide portion 780, respective optical output waveguides 781 emit the optical signals being received from respective light converging lenses 771 to respective optical fibers 791 on the emissive side individually.

In the output-side optical fiber array 790, the respective optical fibers 791 are aligned on a substrate 792. Like the input-side optical fiber array 710, a plurality of V-shaped grooves are formed on a surface of the substrate 792. The optical fibers 791 are fitted into the grooves respectively. Incident ends of the optical fibers 791 are connected to emissive ends of respective optical output waveguides 781, and then the optical signals from respective optical output waveguides are output to the outside.

Such optical switch 700 will be operated as follows.

The optical signals that are input into the optical input waveguides 721 from respective optical fibers 711 are converted into parallel lights by the collimator lenses 731, and then are input into the input-side optical deflector elements 741. When the voltages applied to the prism electrodes are controlled, the input-side optical deflector elements 741 change arbitrarily the propagation direction of the incident optical signals and then cause such optical signals to input into any output-side optical deflector element 761 in the output-side optical deflector element portion 760 via the common optical waveguide 750.

When the voltages applied to the prism electrodes are controlled, the output-side optical deflector elements 761 change the propagation directions of the optical signals such that the incident optical signals are input into the corresponding light converging lenses 771 on the emissive side. The optical signals that are incident on the light converging lenses 771 are focused and input onto the corresponding optical output waveguides 781 on the emissive side. The optical signals are output from the optical output waveguides 781 to the outside through the optical fibers 791.

Accordingly, in the above optical switch 700, if the voltages that are applied to the input-side optical deflector elements 741 and the output-side optical deflector elements 761 respectively are controlled, respective optical signals supplied from a plurality of input channels can be switched to any output channels and then be output thereto.

Next, configurations of the collimator portion 730 and the light converging portion 770 in the above optical switch 700 will be explained in detail hereunder.

Figure 21:
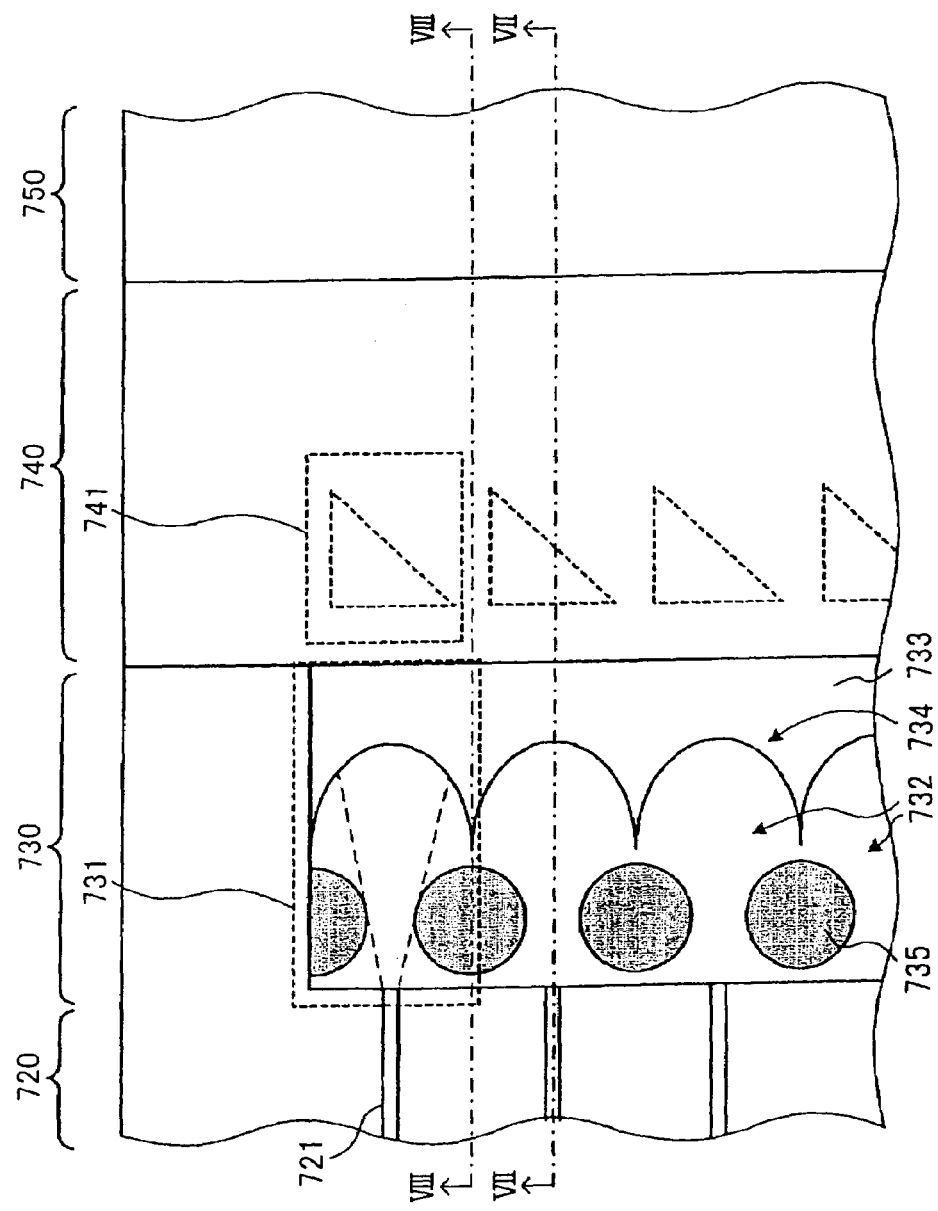
FIG. 21 is a plan view showing a configuration of a collimator portion and its periphery of a two-dimensional lens array according to a ninth embodiment of the present invention.

FIG. 21 is a plan view showing a configuration of the collimator portion 730 and its peripheral portion of the two-dimensional lens array according to the ninth embodiment of the present invention. Also, FIGS. 23A and 23B are sectional views showing the configurations of the collimator portion 730 and its peripheral portion respectively.

FIG. 21 shows an enlarged view of a part of the collimator portion 730 and its peripheral portion in the optical switch 700 shown in FIG. 22. Also, FIG. 23A shows a sectional view taken along a VII—VII line in FIG. 21, and FIG. 23B shows a sectional view taken along a VIII—VIII line therein.

Figure 23:
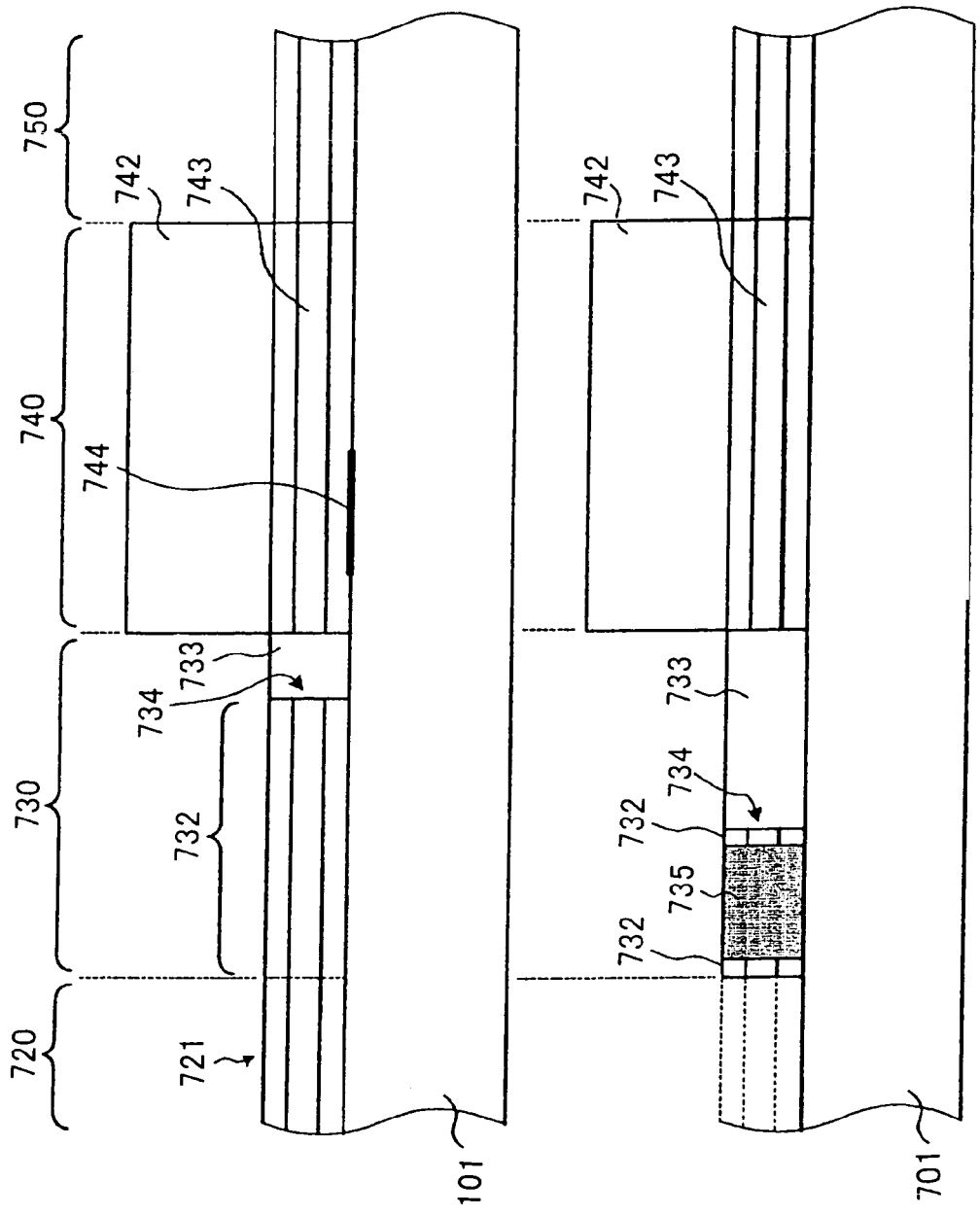
FIGS. 23A and 23B are sectional views showing the configurations of the collimator portion and its periphery respectively.

As shown in FIG. 21 and FIGS. 23A and 23B, the optical input waveguide portion 720, the collimator portion 730, the input-side optical deflector element portion 740, and the common optical waveguide 750 are provided on the same substrate 701.

The collimator portion 730 has waveguide layers 732 as the slab optical waveguides on which the optical signals are incident from the optical input waveguides 721, and air-gap filling layers 733 which are formed by being filled with a medium with a refractive index that is different from the waveguide layers 732. The air-gap filling layers 733 are formed by filling the air-gap region formed by removing the core layer and the overlying/underlying cladding layers of the waveguide layer 732 with the fluororesin for preventing the diffusion of light. Here, the overlying/underlying cladding layers of the waveguide layer 732 are formed of the quartz and the core layers thereof are formed of the quartz into which Ge is doped to enhance the refractive index. The refractive index of the fluororesin in the air-gap filling layers 733 is set slightly lower than them.

Then, the end surface of the waveguide layer 732 opposing to the air-gap filling layers 733 has its center on an optical axis of the optical signal from each optical input waveguide 721. Here, such end surface is shaped into a circular cylindrical shape, for example and is used as a lens curved surface 734 of the collimator lens 731 acting as the two-dimensional lens. According to such structure, in the collimator lens 731, the optical signal that propagates through the waveguide layer 732 from the optical input waveguide 721 to spread radially is converted into the parallel light by the lens curved surface 734, and then is output to each input-side optical deflector element 741 in the input-side optical deflector element portion 740.

In this case, as shown in FIGS. 23A and 23B, the input-side optical deflector element portion 740 arranged on the emissive side of the collimator portion 730 has a structure such that slab optical waveguides 743 made of the electrooptic crystal are put between the prism electrode 744 and the conductive substrate 742 which are oppose to each other through the slab optical waveguides 743. In this input-side optical deflector element portion 740, if the voltage is applied between the prism electrode 744 and the conductive substrate 742, the refractive index of the slab optical waveguide 743 in the region that is interposed therebetween is changed. Thus, the propagation direction of the optical signal that is input from the collimator lens 731 is switched in the slab optical waveguide 743.

Incidentally, in the collimator portion 730, the optical signal that is input from the optical input waveguide 721 propagates through the waveguide layer 732 to spread radially. At this time, most part of the propagated light is passed through the lens curved surface 734 and is converted into the parallel light. In other words, in the waveguide layer 732, the lens curved surface 734 can correctly collimate only the light being propagated through the predetermined sectorial region, which spreads toward the lens curved surface 734 from the emissive end of the optical input waveguide 721 as the center point. However, since actually the light being propagated through the outside of this region is present, in some cases such light is diffused at the end portion of the lens curved surface 734, or such light is output directly to the neighboring lens curved surface 734.

For this reason, in the present invention, a light absorbing body 735 is arranged on both sides of the propagation region of the light, which is incident on each lens curved surface 734, in the waveguide layer 732. In the present embodiment, since the neighboring lens curved surfaces 734 are formed to contact to each other, the light absorbing body 735 is provided between the boundary of the lens curved surfaces and the incident end of the waveguide layer 732 one by one. Also, as shown in FIGS. 23A and 23B, for example, the light absorbing body 735 is provided to pass through the core layer and the overlying/underlying cladding layers of the waveguide layer 732. As the material of the light absorbing body 735, the black resin material into which the carbon is dispersed, for example, is employed.

The light that propagates through the region in which the light is not correctly collimated by the lens curved surface 734 can be absorbed by such light absorbing body 735, and thus the propagation of the light to the neighboring lens curved surface 734 can be prevented. Thus, it prevents the generation of the crosstalk of the optical signals, which are output from the collimator portion 730, between the neighboring channels.

Also, it is desired that the light absorbing body 735 should be formed to separate its end portion in the emissive direction from the end portion of each lens curved surface 734. In addition, it is desired that the light absorbing body 735 should be formed to separate its end portion in the incident direction from the incident end of the waveguide layer 732. Accordingly, as described later, if the core layer and the cladding layers, which correspond to the area into which the light absorbing body 735 is provided, are removed from the waveguide layer 732 as the uniform slab waveguide and then the removed area is filled with the resin material and then the resin material is solidified, the light absorbing body 735 can be easily provided. In this case, it is desired that, in order to prevent the leakage of the light into the neighboring lens curved surface 734 and suppress an amount of generation of the crosstalk, both respective areas in which the light absorbing body 735 is provided and respective intervals between the end portions of the lens curved surface 734 and the incident ends of the waveguide layers 732 should be reduced as small as possible.

Also, in the present embodiment, as an example, the light absorbing body 735 is formed to have a circular shape or an elliptic shape when viewed from the top. According to such shape, for example, the light being emitted from the optical input waveguide 721 can be prevented from being scattered at the side surface of the light absorbing body 735, etc. In this case, a length of the circular or elliptic light absorbing body 735 in the width direction (the vertical direction in FIG. 21) is set such that the light being output from the optical input waveguide 721 can be input into at least an inside of the corresponding lens curved surface 734. In addition, it is desired that the width of the light absorbing body 735 should be set in answer to the width that is required for the collimated light emitted from the lens curved surface 734.

Figure 24:
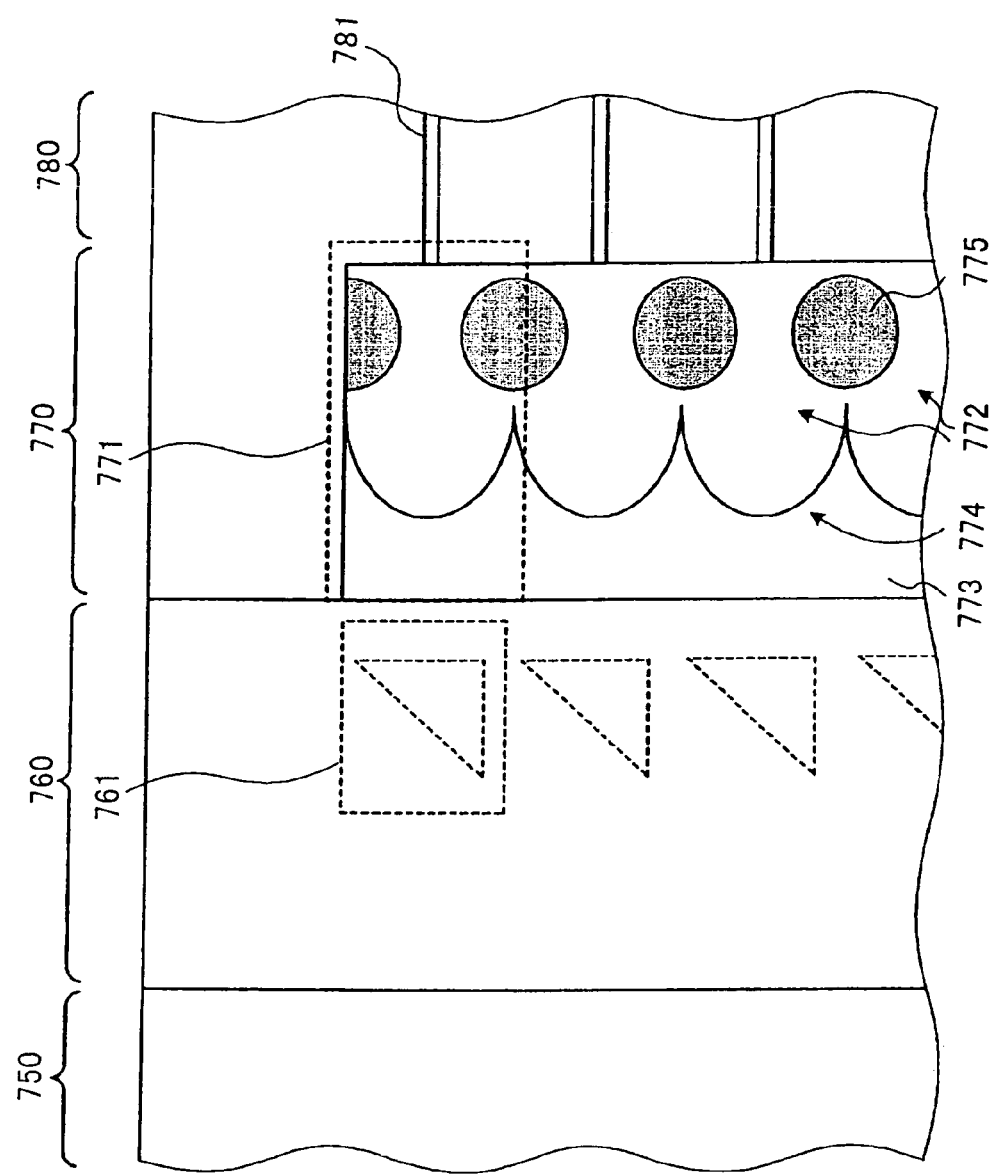
FIG. 24 is a plan view showing configurations of a light converging portion of its periphery of the two-dimensional lens array according to the ninth embodiment of the present invention.

Next, FIG. 24 is a plan view showing configurations of the light converging portion 770 and its peripheral portion.

FIG. 24 shows an enlarged view of a part of the light converging portion 770 and its peripheral portion in the optical switch 700 shown in FIG. 22. The output-side optical deflector element portion 760, the light converging portion 770, and the optical output waveguide portion 780, shown in FIG. 24, are provided on the same substrate 701 (not shown) on which the above optical input waveguide portion 720, etc. are provided.

Also, the output-side optical deflector element portion 760, the light converging portion 770, and the optical output waveguide portion 780 have the same structures as those of the input-side optical deflector element portion 740, the collimator portion 730, and the optical input waveguide portion 720 which are provided opposedly to put the common optical waveguide 750 therebetween, respectively.

More particularly, the light converging portion 770 has waveguide layers 772 as the slab optical waveguides that propagate the optical signals to the optical output waveguides 781 respectively, and air-gap filling layers 773 which are formed by filling with the medium with a refractive index that is different from the waveguide layers 772. Also, in the air-gap filling layers 773, the air-gap region which is formed by removing the core layer and the overlying/underlying cladding layers of the waveguide layer 772 is filled with the fluororesin for preventing the diffusion of light. Here, like the collimator portion 730, the overlying/underlying cladding layers of the waveguide layer 772 are formed of the quartz and the core layers are formed of the quartz into which Ge is doped to enhance the refractive index. The refractive index of the fluororesin in the air-gap filling layers 773 is set slightly lower than them.

Then, the end surface of the waveguide layer 772 opposing to the air-gap filling layers 773 is shaped into the circular cylindrical surface that has the center on an optical axis of the optical signal from each optical input waveguide 781. Here, this end surface is shaped into a lens curved surface 774 of the light converging lens 771 acting as the two-dimensional lens. According to such structure, in respective light converging lenses 771, the optical signals, that are emitted from respective output-side optical deflector elements 761 and passed through the air-gap filling layers 773, propagate through the waveguide layers 772 from the lens curved surfaces 774 and then are focused on the incident ends of respective optical output waveguides 781 and input therein.

Also, like the collimator portion 730, in the waveguide layer 772, a light absorbing bodies 775 are arranged on both sides of the propagation region of the lights, which propagate from respective lens curved surfaces 774 to focus onto the optical output waveguide 781. For example, the light absorbing body 775 is provided to pass through the core layer and the overlying/underlying cladding layers of the waveguide layer 772. As the material of the light absorbing body 775, the black resin material into which the carbon is dispersed, for example, is employed.

In this light converging portion 770, the optical signals being input from the respective output-side optical deflector elements 761 are the substantially parallel light. However, because of errors of respective elements of this optical switch 700 at the time of manufacture, variation in the performance of the output-side optical deflector elements 761, etc., in some cases the width of the light that passes through the lens curved surface 774 (the length in the vertical direction in FIG. 24) is not always kept constant. In such case, all the lights that are passed through the lens curved surface 774 are not focused onto the incident ends of the optical output waveguide 781, and extra lights are emitted to the surrounding area of the optical output waveguide 781. Thus, in some cases this light exerts a bad influence on the optical signal that propagates through the optical output waveguide 781. Otherwise, the extra lights are reflected by the end surface of the waveguide layer 772 on the emissive side to return to the inside of the light converging portion 770 and then to input into the neighboring lens curved surface 774. Thus, in some cases the quality of the optical signal is possible to be deteriorated.

As the measure for this, the light absorbing bodies 775 are arranged on both sides of the propagation area of the optical signal in the light converging portion 770. It can absorb the extract light that propagates in the area in which the light is not correctly converged by the lens curved surface 774, and thus It results in reducing the noise component contained in the optical signal that is incident on the optical output waveguide 781, etc. Therefore, the quality of the propagated optical signal can be enhanced.

As described above, the present invention leads to realization of the high-performance optical switch in which the crosstalk between the channels and the noises in the optical signal are reduced.

Next, a method of manufacturing the above optical switch 700 will be explained hereunder.

Figure 25A:
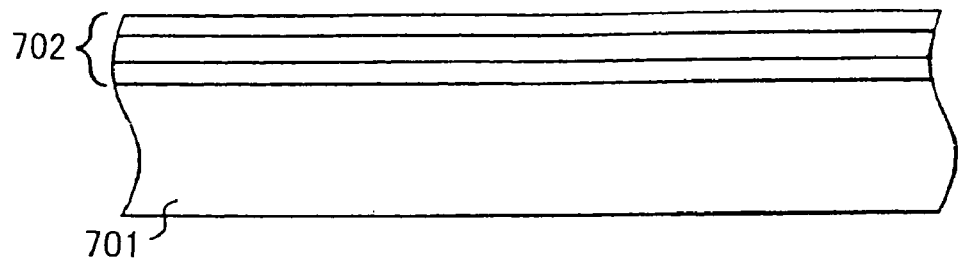
FIGS. 25A, 25B, and 25C are sectional views showing a method of manufacturing the optical switch module respectively.
Figure 25B:
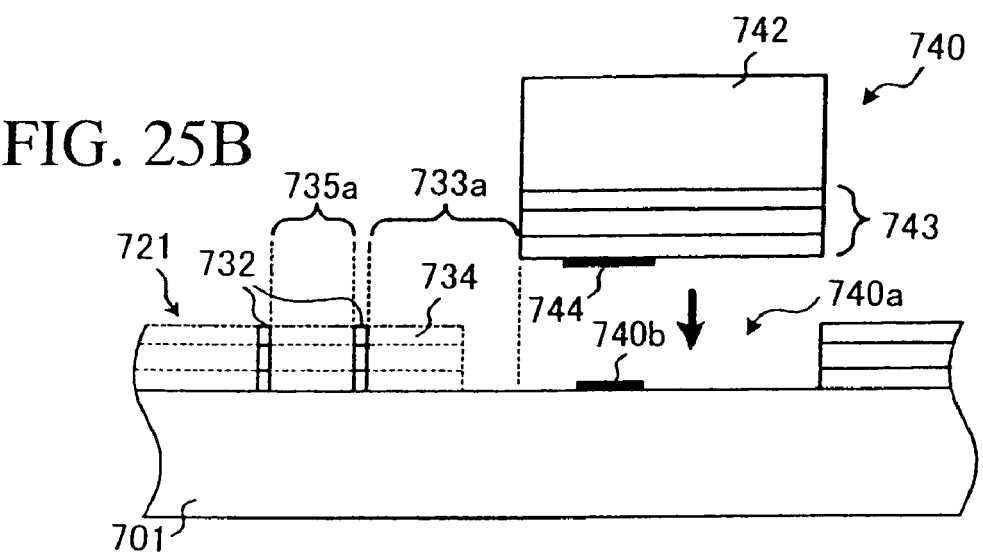
Figure 25C:
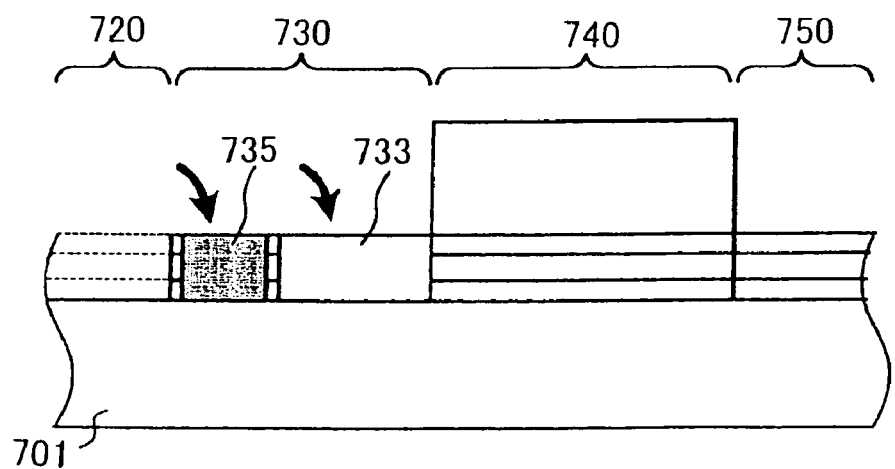

FIGS. 25A, 25B, and 25C are views for explaining the method of manufacturing the optical switch 700. In this case, FIGS. 25A, 25B, and 25C show a cross section of the portion of the optical switch 700, which corresponds to FIG. 23B, respectively.

The above optical switch 700 has a structure such that the optical input waveguide portion 720, the collimator portion 730, the common optical waveguide 750, the light converging portion 770, and the optical output waveguide portion 780 are formed integrally on the substrate 701, then the input-side optical deflector element portion 740 and the output-side optical deflector element portion 760 are mounted on the substrate 701, and then the input-side optical fiber array 710 and the output-side optical fiber array 790 are connected.

As shown in FIG. 25A, first a uniform slab optical waveguide 702 is formed on the substrate 701. As the substrate, the quartz, the Si wafer, or the like is used. In the case of the quartz, this substrate 101 also functions as the underlying cladding layer of the slab optical waveguide 702 formed thereon. The core layer is formed of the quartz, whose refractive index is enhanced by diffusing Ge thereinto, on the substrate 101 and then the overlying cladding layer is formed of the quartz thereon. The core layer and the overlying cladding layer are formed by the MOCVD (Metal Organic Chemical Vapor Deposition) method, or the like, for example.

Then, an etching mask made of a metal film is formed on a surface of the overlying cladding layer of the slab optical waveguide 702 by the photolithography method and the sputtering method. Then, the overlying cladding layer and the core layer are etched collectively by the reactive ion etching (RIE) using the fluorine gas, or the like while employing the etching mask. Thus, as shown in FIG. 25B, not only the optical input waveguides 721 and the common optical waveguide 750 are formed, but also air gaps 733a, the waveguide layers 732, the lens curved surfaces 734, and filling portions 735a for being filled with the material of the light absorbing body 735, in the collimator portion 730 and mounting portions 740a, on which the input-side optical deflector element portion 740 is mounted, are formed.

In this case, for example, if a width of the core layer is set to 5 μm and a pitch between the optical input waveguides 721 is set to 2.5 mm, a size of the filling portion 735a is decided so that the width of the optical signal that is collimated by the lens curved surface 734 is set to 0.6 mm.

Here, the area of the filling portion 735a of the light absorbing body 735 is formed away from the end portion of the lens curved surface 734 and the incident end of the waveguide layer 732. Thus, as shown in FIG. 25B, the filling portion 735a of the light absorbing body 735 is shaped into a concave shape that is surrounded by the waveguide layer 732.

Although not shown, the air gaps, the waveguide layers 772, the lens curved surfaces 774, and filling portions for being filled with the light absorbing body 775, in the light converging portion 770 and mounting portions, on which the output-side optical deflector element portion 760 is mounted, are formed simultaneously on the substrate 701 at the time of the above collective etching.

Then, electrodes 740b that are connected to the prism electrodes 744 of the respective input-side optical deflector elements 741 are provided to bottom surfaces of the mounting portions 740a, on which the input-side optical deflector element portion 740 is mounted. These electrodes 740b are formed by coating a resist on the bottom surfaces of the mounting portions 740a, then applying the patterning to the resist, then laminating a titanium film by the sputtering method, and then laminating a platinum film by the lift-off method.

Here, the input-side optical deflector element portion 740 is manufactured as follows. The input-side optical deflector element portion 740 has a structure such that the slab optical waveguides 743 are formed on the conductive substrate 742 and then the prism electrodes 744 are provided thereon. As the conductive substrate 742, STO ($SrTiO_3$) single crystal as the ferroelectric substance, into which Nb is doped to provide the conductivity, is employed. Also, in the slab optical waveguides 743, PZT ($Pb(Zr_yTi_{1-y}O_3)$) and PLZT ($Pb_xLa_{1-x}(Zr_yTi_{1-y}O_3)$) are used as the core layer and the overlying/underlying cladding layers respectively. This slab optical waveguide 743 is formed by laminating PZT, PLZT, and PZT on the conductive substrate 742 in this order. For laminating them, the heteroepitaxial growth is implemented by the sol-gel method, the PLD (Pulsed Laser Deposition) method, the MOCVD method, or the like.

Then, the triangular prism electrodes 744 are formed in parallel alignment on the surfaces, which oppose to the conductive substrate 742 of the slab optical waveguide 743, as many as the input channels. These prism electrodes 744 are formed by forming a film by the photolithography method using a metal such as a platinum film, or the like, and then polishing the film into a predetermined size.

In this case, the output-side optical deflector element portion 760 has the totally same structure as that of the input-side optical deflector element portion 740, and is manufactured by the same steps.

Then, the input-side optical deflector element portion 740 and the output-side optical deflector element portion 760 are mounted on the substrate 701. In the case of the input-side optical deflector element portion 740, as shown in FIG. 25B, the input-side optical deflector element portion 740 is fixed by connecting the prism electrodes 744 and the corresponding electrodes 740b on the substrate 701 via the solder bump, or the like while directing its surface, on which the prism electrodes 744 are provided, toward the substrate 701 side. At this time, the alignment between the optical waveguides positioned on the incident side and the emissive side must be executed precisely. In this case, the output-side optical deflector element portion 760 is mounted similarly onto the substrate 701.

Then, as shown in FIG. 25C, the air gaps 733a between the waveguide layers 732 in the collimator portion 730 and the input-side optical deflector element portion 740 is filled with the fluororesin having the thermosetting property. The fluororesin has the refractive index that is slightly lower than the quartz constituting the waveguide layers 732. The air-gap filling layers 733 are formed by heating the filling fluororesin to solidify. At this time, the air-gap filling layers 773 in the light converging portion 770 are also formed simultaneously by the same method.

Meanwhile, the air gaps may be used, as they are, not to be filled with the fluororesin. In this case, since the refractive index of the air is different from that of the fluororesin, a curvature of the lens curved surface must be changed. However, in the case of the air gaps, since the light that passed through the lens curved surface is ready to scatter, it is desired that it should be filled with the material for preventing the scattering of light by the fluororesin etc.

Then, as shown in FIG. 25C, the filling portions 735a of the collimator portion 730 is filled with the material of the light absorbing body 735 by the screen printing method. As the material, the black resin material into which the carbon is dispersed, for example, is employed, and is solidified after the filling. Here, since the surrounding area of the filling portion 735a is formed like the concave shape that is surrounded by the waveguide layer 732, materials of the light absorbing body 735 and the air-gap filling layer 733 are not mixed together. Therefore, both the light absorbing body 735 and the air-gap filling layer 733 can be easily formed by being filled with respective materials into the concave areas merely. Although not shown, at this time, the filling portions that are formed in the light converging portion 770 are also filled with the material of the light absorbing body 735.

According to the above method of manufacturing the optical switch 100, the uniform slab optical waveguide 702 is formed on the common substrate 701 and then the filling portions of the light absorbing body 735 as well as the optical input waveguides, the air gaps, etc. can be formed collectively by etching the slab optical waveguide 702. Therefore, the filling portions of the light absorbing body 735 can be formed not to largely change the conventional manufacturing steps. Also, since the filling portion is formed as the area that is surrounded by the waveguide layer, the light absorbing body 735 can be formed easily by merely injecting the material into this area.

As a result, according to the present invention, the optical switch in which the crosstalk between the channels can be reduced and the quality of the propagated optical signal can be improved can be manufactured effectively.

In the above ninth embodiment, in the collimator portion 730 and the light converging portion 770, the material whose refractive index is lower than that of the waveguide layer is employed for the air-gap filling layer. But the material such as the epoxy resin, or the like, which has the high refractive index, can be employed for the air-gap filling layer. In this case, the shape of the lens curved surface must be changed from the concave lens to the convex lens.

Also, in the collimator portion 730 and the light converging portion 770, respective lens shapes of the collimator lens 731 and the light converging lens 771 are formed as the circular cylindrical shape. But the aspherical lens may be applied.

In addition, in the collimator portion 730 and the light converging portion 770, the lens curved surfaces are provided only on one of the incident side and the emissive side to put the air-gap filling layer therebetween respectively. But such lens curved surfaces may be provided on the incident side and the emissive side to oppose to each other respectively. In this case, for example, in the case of the collimator portion 730, the waveguide layer should be arranged not only on the incident side of the air-gap filling layer 733 but also between the emissive side and the mounting portion of the input-side optical deflector element portion 740. Similarly, in the case of the light converging portion 770, the waveguide layer should be arranged between the incident side of the air-gap filling layer 773 and the mounting portion of the emissive-side optical deflector element portion 760.

Also, in the above ninth embodiment, in both the collimator portion 730 and the light converging portion 770, the air-gap filling layer is provided integrally to all channels by jointing the neighboring lens curved surfaces. The present invention is not limited to this. The neighboring lens curved surfaces may be separated. In this case, the air-gap filling layers are provided as the areas, which are surrounded by the waveguide layer, individually in response to respective lens curved surfaces.

Also, in the above ninth embodiment, the optical input waveguides 721 are connected to the collimator portion 730 and the optical signals are input thereto. However, for example, the optical fibers may be directly connected to the incident ends of the waveguide layers 732 in the collimator portion 730. Similarly, the optical fibers may be directly connected to the emissive ends of the waveguide layer 772 in the light converging portion 770.

Also, in the above ninth embodiment, the example in which the two-dimensional lens array is applied to the optical switch as the collimator portion and the light converging portion is shown. However, the present invention is not limited to this. The present invention may be applied other optical devices having the area in which the optical signals propagate in parallel through a plurality of channels.

As described above, according to the two-dimensional lens array of the present invention, for example, if the optical signal propagates through the slab optical waveguide to the lens curved surface, the light absorbing body is provided in the slab optical waveguide on both sides of the propagation area of the optical signal, and therefore the extra light that is not precisely incident on the lens curved surface and the scattered light from the end portion of the lens curved surface, etc. can be absorbed by such light absorbing body. Therefore, the incidence of the light into the neighboring lens curved surface can be prevented and also generation of the crosstalk between the neighboring channels can be reduced. Also, if the optical signal is incident on the slab optical waveguide from the lens curved surface, the extra light that passed through the lens curved surface and then propagates through the outside of the predetermined area of the emissive end can be absorbed by the light absorbing body. Therefore, only the necessary light is emitted from the emissive side, and thus the quality of the propagated optical signal can be enhanced.

Also, according to the optical switch of the present invention, since the first light absorbing body is provided on both sides of the propagation area of the optical signal from the optical input waveguide to the corresponding collimator lens, the extra light that is not precisely incident on the collimator lens and the scattered light from the end portion of the lens curved surface of the collimator lens, etc. can be absorbed by such first light absorbing body. Therefore, the incidence of the light into the neighboring lens curved surface can be prevented and also the generation of the crosstalk between the neighboring channels can be reduced. Also, since the second light absorbing body is provided on both sides of the propagation area of the optical signal from the light converging lens to the corresponding optical output waveguide, the extra light that is not precisely incident on the lens curved surface can be absorbed by such second light absorbing body. Therefore, only the necessary light is emitted from the optical output waveguide, and thus the quality of the propagated optical signal can be enhanced.

What is claimed is:

1. An optical switch module comprising:
   a collimator portion for collimating a plurality of optical signals individually by two-dimensional lenses respectively;
   a plurality of first optical deflector elements for switching propagation directions of the optical signals, which passed through the collimator portion, individually by using an electrooptic effect respectively;
   a common optical waveguide for propagating the optical signals that passed through the plurality of first optical deflector elements respectively;
   a plurality of second optical deflector elements for switching the propagation directions of the optical signals, which passed through the common optical waveguide, individually by using the electrooptic effect respectively; and
   a light converging portion for converging the optical signals, which passed through the plurality of second optical deflector elements, individually by the two-dimensional lenses respectively;
   wherein at least any one of the collimator portion and the light converging portion is provided with the coupling structural body of optical parts, constructed by arranging a first optical waveguide in which an underlying cladding layer with a refractive index nuj, a core layer with a refractive index ncj, and an overlying cladding layer with a refractive index noj are laminated, and a second optical waveguide in which an underlying cladding layer with a refractive index nuk, a core layer with a refractive index nck, and an overlying cladding layer with a refractive index nok are laminated, are arranged to oppose end surfaces, from which the overlying cladding layer to the underlying cladding layer are exposed, to each other, and then filling a portion between mutual end surfaces with a filling medium with a refractive index ni(j,k),
   whereby at least one end surface of both end surfaces is formed as a two-dimensional lens and a light propagates from one optical waveguide to other optical waveguide through the filling medium.

2. An optical switch module according to claim 1, wherein refractive indexes of core layers constituting the first optical deflector elements and the second optical deflector elements are set higher than any of refractive indexes of core layers in the collimator portion, the common optical waveguide, and the light converging portion.

3. An optical switch module comprising:
a collimator portion for collimating a plurality of optical signals individually by two-dimensional lenses respectively;
a plurality of first optical deflector elements for switching propagation directions of the optical signals, which passed through the collimator portion, individually by using an electrooptic effect respectively;
a common optical waveguide for propagating the optical signals that passed through the plurality of first optical deflector elements respectively;
a plurality of second optical deflector elements for switching the propagation directions of the optical signals, which passed through the common optical waveguide, individually by using the electrooptic effect respectively; and
a light converging portion for converging the optical signals, which passed through the plurality of second optical deflector elements, individually by the two-dimensional lenses respectively;
wherein the collimator portion, the first optical deflector elements, the common optical waveguide, the second optical deflector elements, and the light converging portion have an optical waveguide respectively, and at least any one of the collimator portion and the light converging portion is provided with a coupling structural body of optical parts in which a first optical waveguide having at least a core layer with a refractive index ncj and a second optical waveguide having at least a core layer with a refractive index nck are arranged to oppose end surfaces to each other, any one of the end surfaces of the first optical waveguide and the second optical waveguide is formed by etching, and the end surface formed by the etching is covered with a surface smoothing coating medium with a refractive index nij or nik that is respectively equal to a refractive index ncj or nck of the core layer that is exposed from the end surface.

4. An optical switch module according to claim 3, wherein refractive indexes of core layers constituting the first optical deflector elements and the second optical deflector elements are set higher than any of refractive indexes of core layers in the collimator portion, the common optical waveguide, and the light converging portion.

* * * * *